July 25, 1961 T. R. SYKES 2,993,583
ROLLER SLAT CONVEYOR DIVERTER MECHANISM
Filed June 3, 1958 12 Sheets-Sheet 1

INVENTOR
THOMAS R. SYKES
ATTY

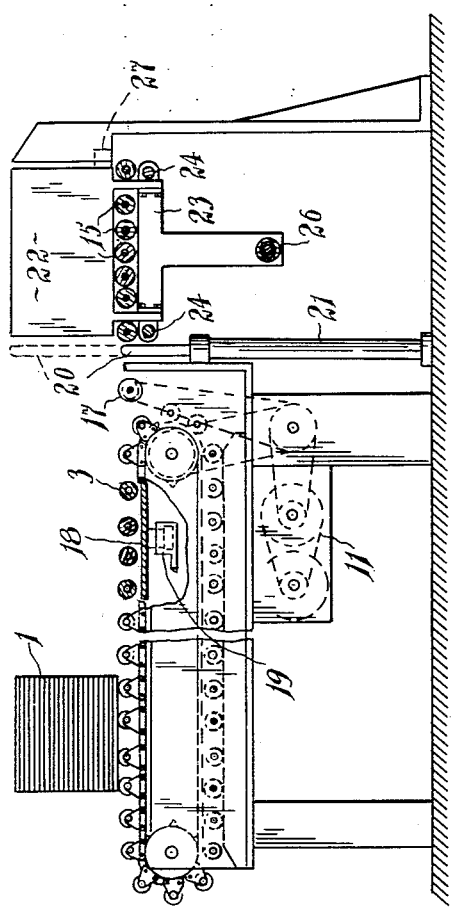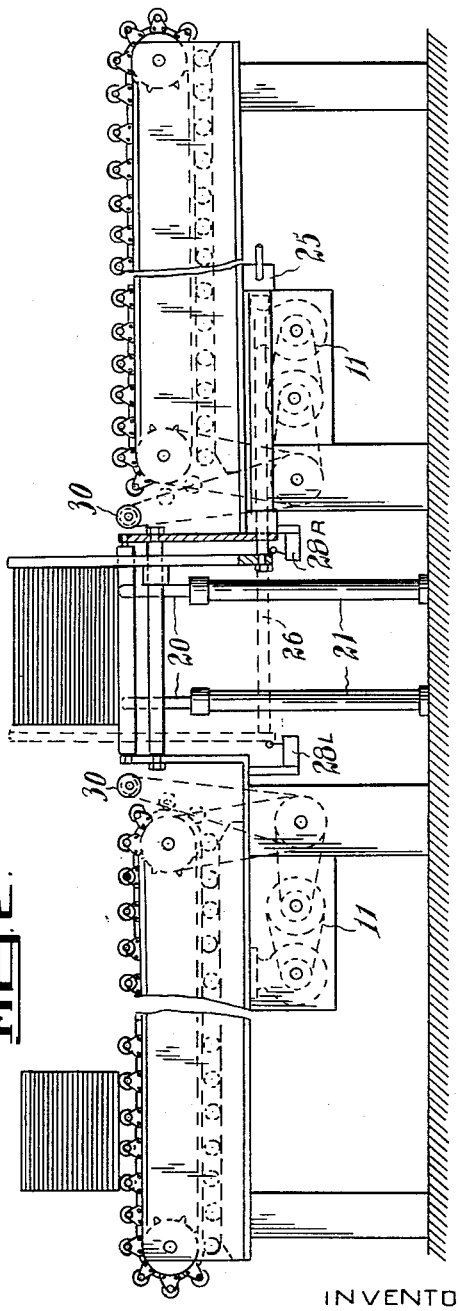

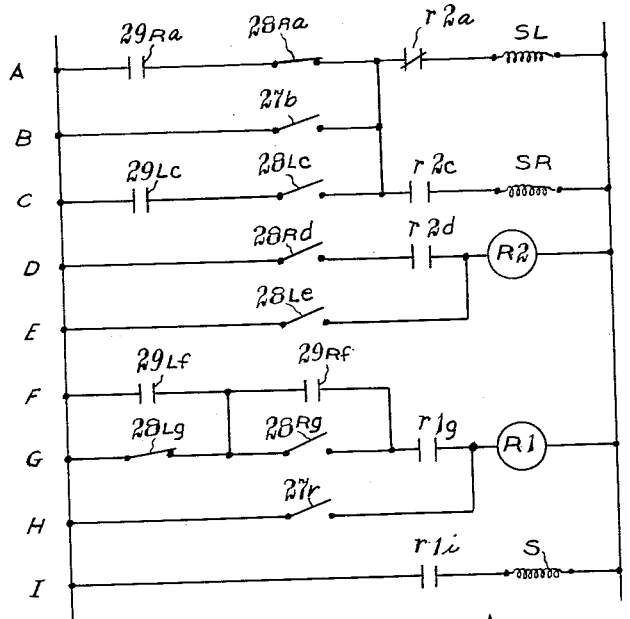

July 25, 1961 T. R. SYKES 2,993,583
ROLLER SLAT CONVEYOR DIVERTER MECHANISM
Filed June 3, 1958 12 Sheets-Sheet 4

INVENTOR
THOMAS R. SYKES
ATTY.

July 25, 1961  T. R. SYKES  2,993,583
ROLLER SLAT CONVEYOR DIVERTER MECHANISM
Filed June 3, 1958  12 Sheets-Sheet 5
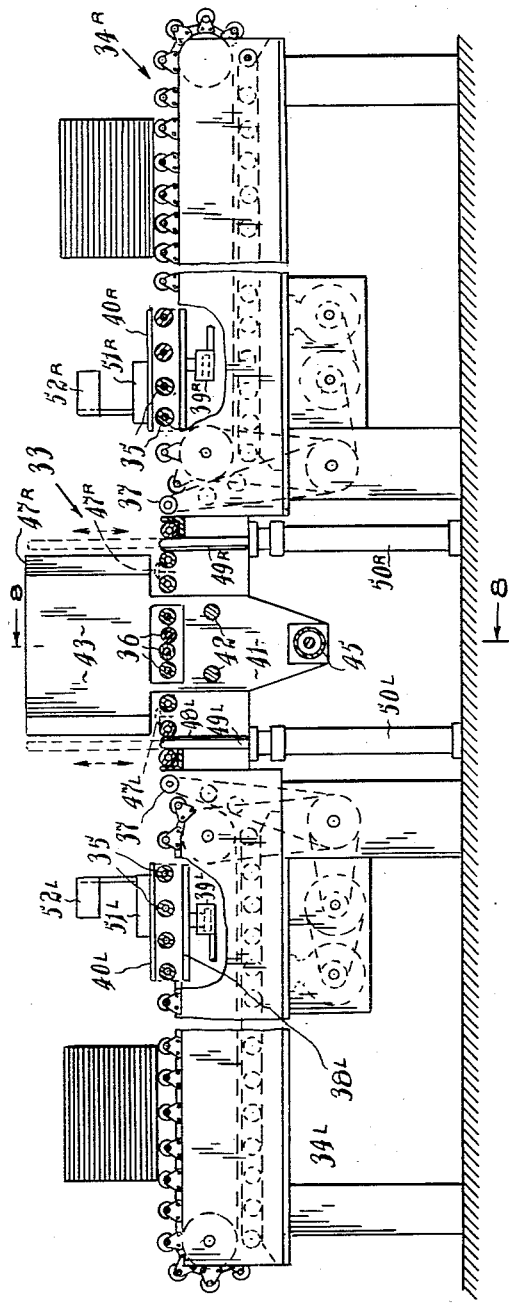
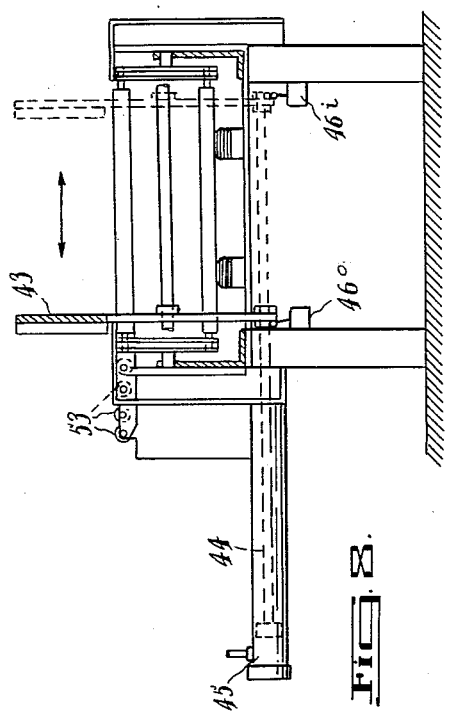
INVENTOR
THOMAS R. SYKES
ATTY.

July 25, 1961

T. R. SYKES 2,993,583

ROLLER SLAT CONVEYOR DIVERTER MECHANISM

Filed June 3, 1958

INVENTOR
THOMAS R. SYKES
BY Douglas S. Johnson
ATTY.

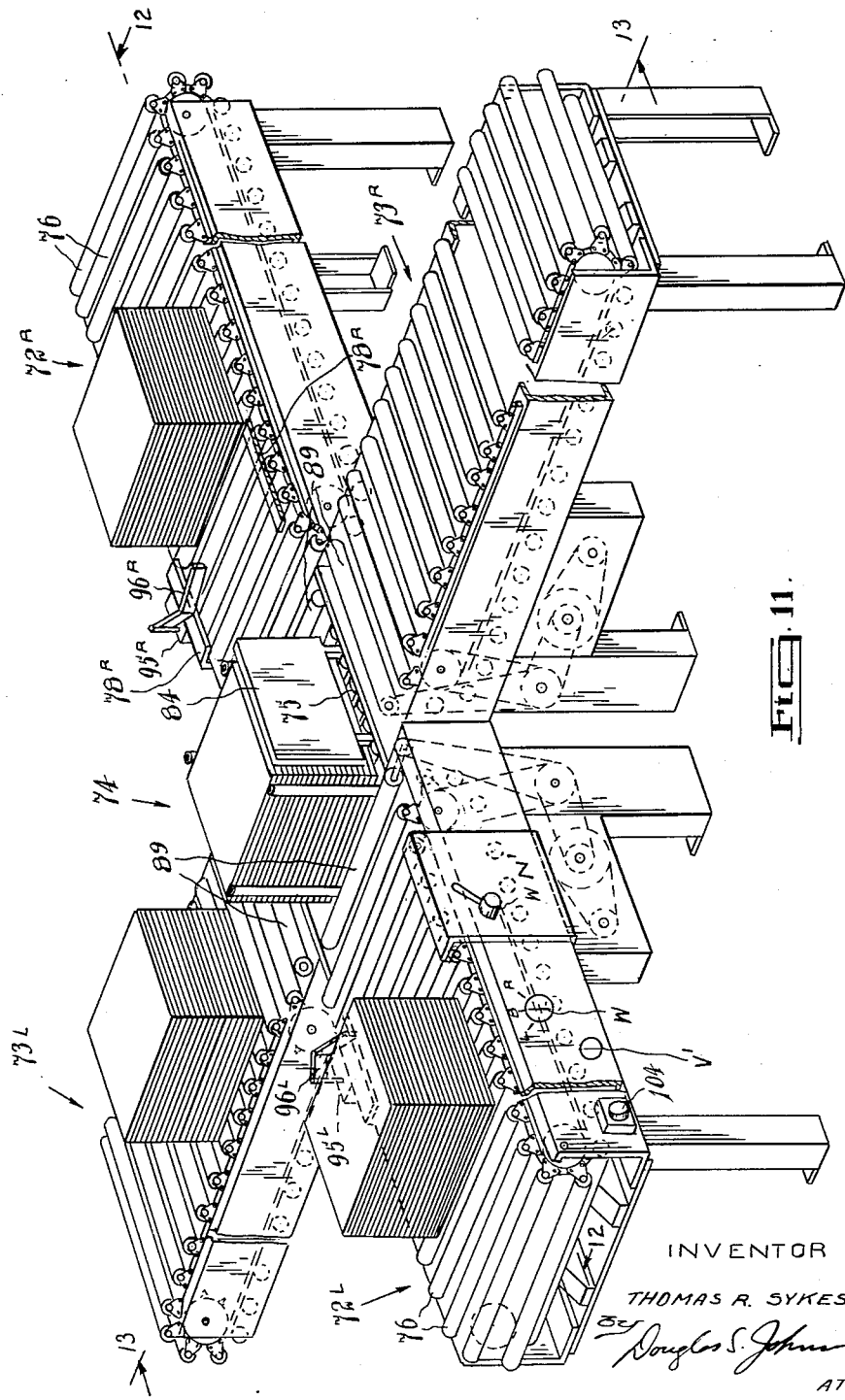

July 25, 1961
T. R. SYKES
2,993,583
ROLLER SLAT CONVEYOR DIVERTER MECHANISM
Filed June 3, 1958
12 Sheets-Sheet 8
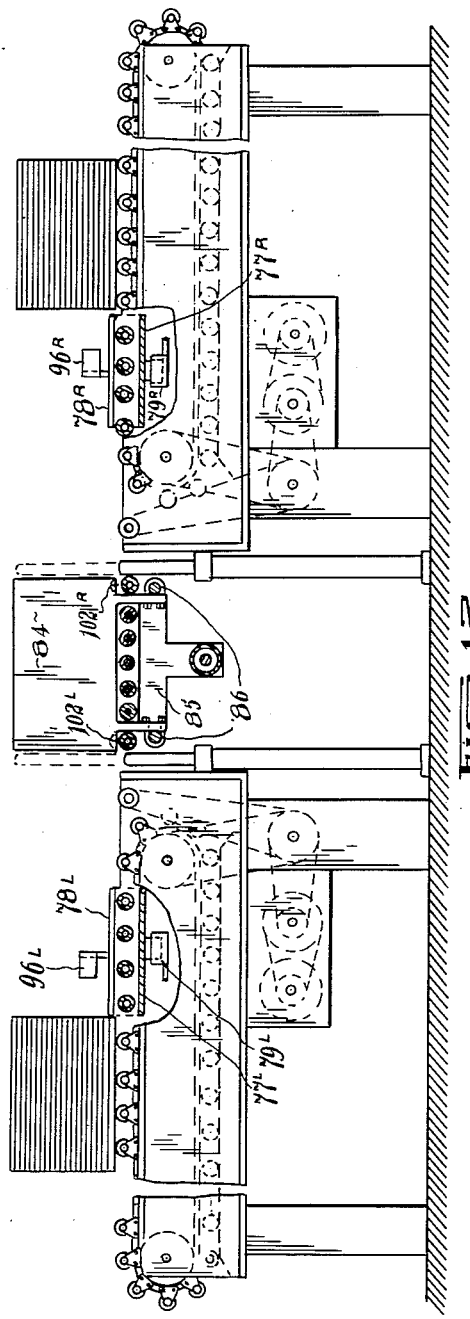
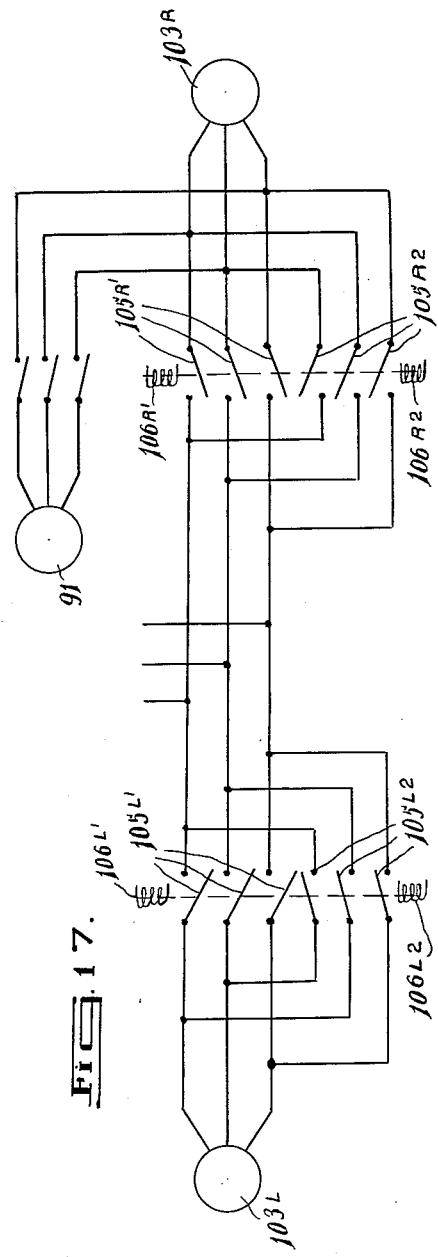
INVENTOR
THOMAS R. SYKES
BY
ATTY.

July 25, 1961 T. R. SYKES 2,993,583
ROLLER SLAT CONVEYOR DIVERTER MECHANISM
Filed June 3, 1958 12 Sheets-Sheet 9
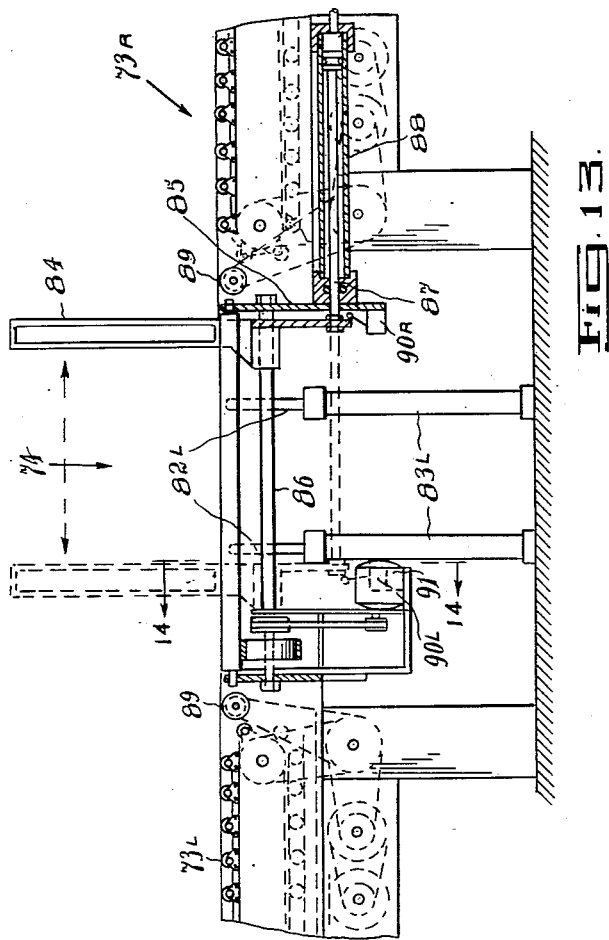
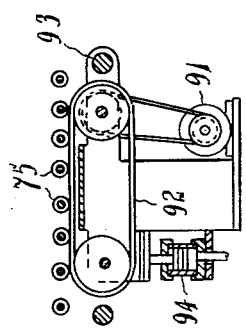
INVENTOR
THOMAS R. SYKES
ATTY.

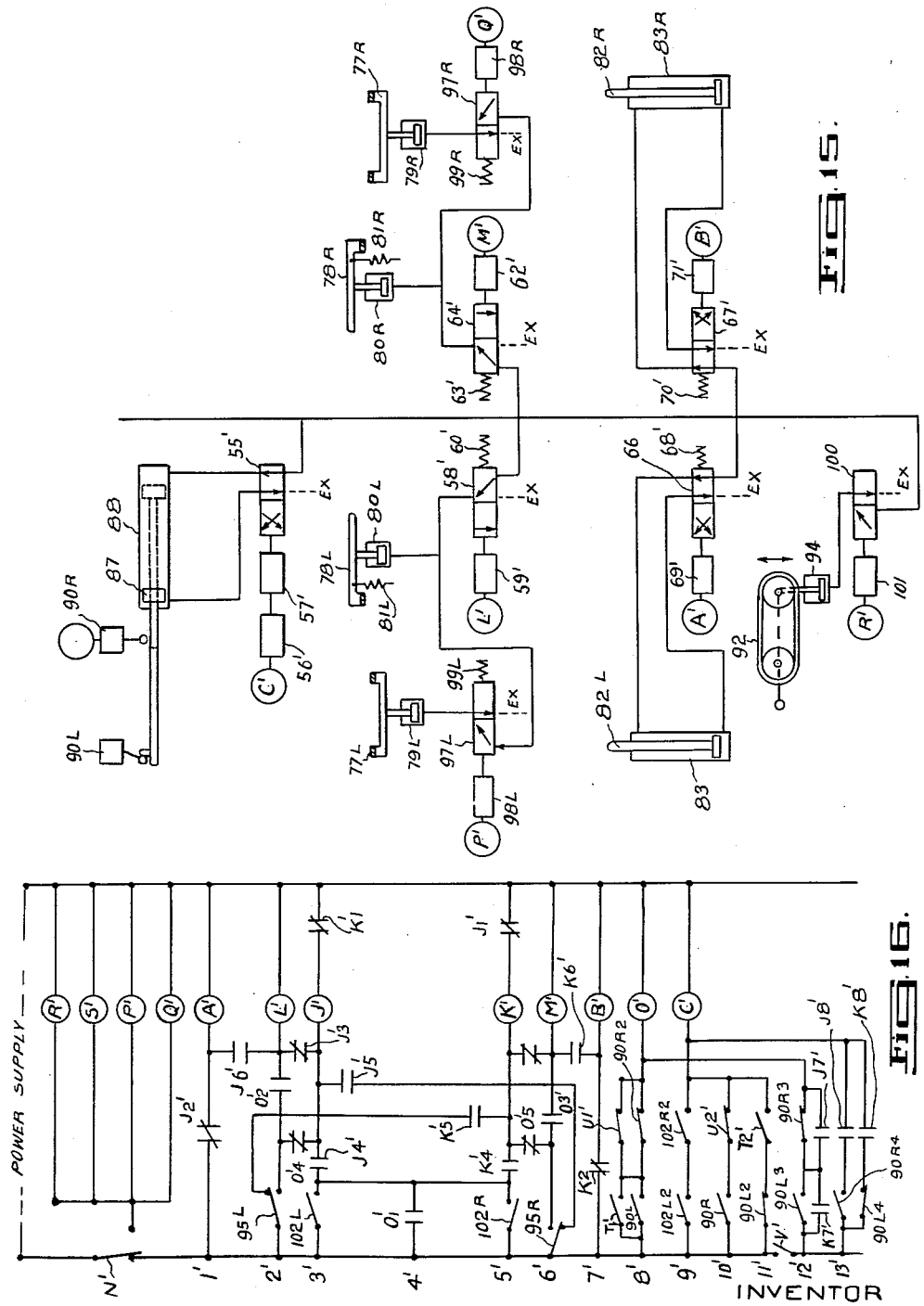

July 25, 1961 T. R. SYKES 2,993,583
ROLLER SLAT CONVEYOR DIVERTER MECHANISM
Filed June 3, 1958 12 Sheets-Sheet 12
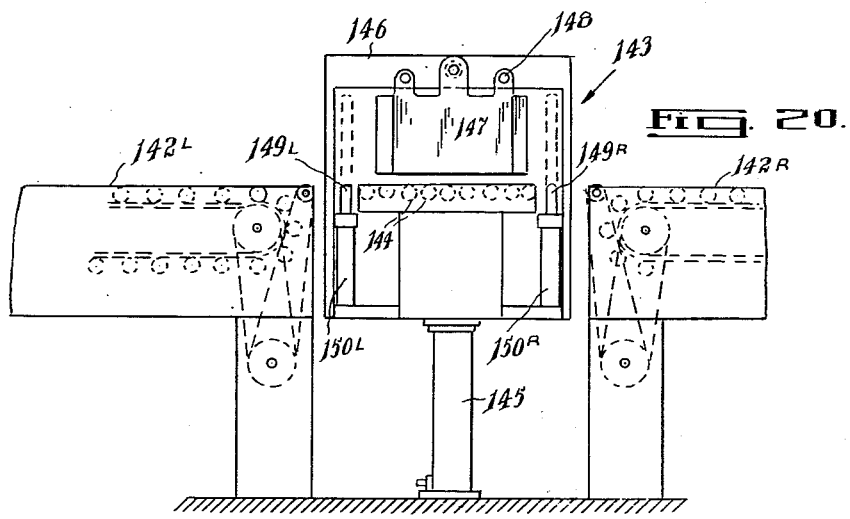
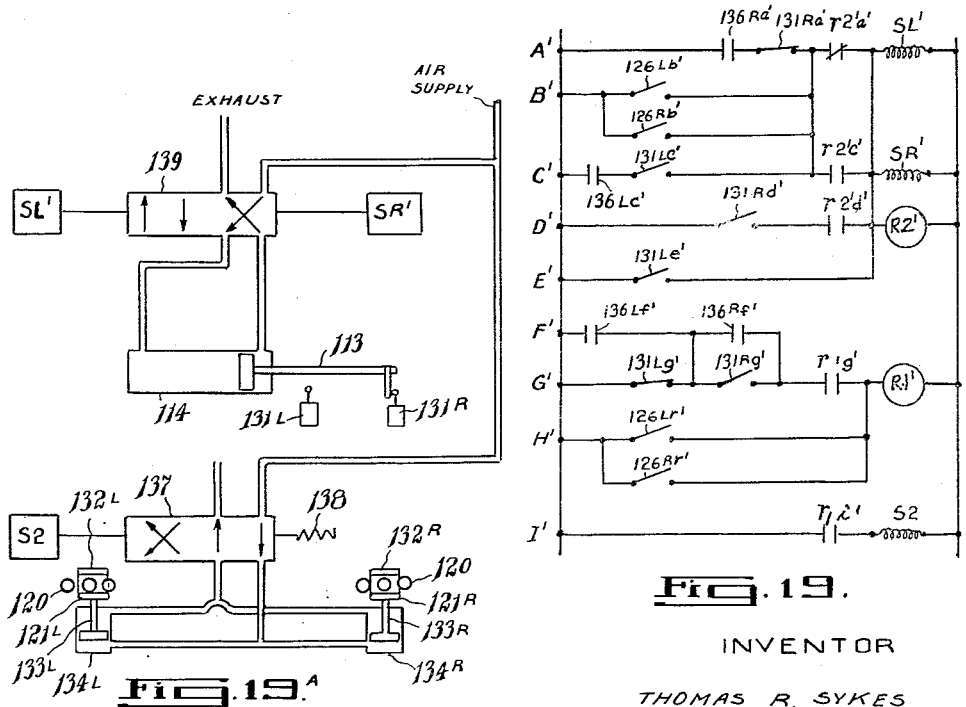
INVENTOR
THOMAS R. SYKES
ATTY.

United States Patent Office 2,993,583
Patented July 25, 1961

2,993,583
ROLLER SLAT CONVEYOR DIVERTER
MECHANISM
Thomas R. Sykes, Toronto, Ontario, Canada, assignor, by mesne assignments, to Toronto Star Limited, Toronto, Ontario, Canada
Filed June 3, 1958, Ser. No. 739,566
47 Claims. (Cl. 198—31)

This invention relates to improvements in conveyor systems and the principal object of the invention is to provide a system in which, for instance, stacks or bundles of newspapers, either tied or untied, packages, articles, objects or groups of articles, objects or other items travelling as a unit on a conventional roller slat conveyor, can be diverted right angularly of the direction of conveyor travel, for instance, onto a right angularly extending side conveyor, or to a discharge station at one side or other of the conveyor, or to a waiting machine.

Another important object is to enable such diversion to be effected either at the end of the conveyor or along its length and to enable the stacks, bundles, packages, articles, objects, or the like being fed on the conveyor to be selectively diverted either to one side or the other of the conveyor according to a desired predetermined diversion pattern or arrangement, or in the case where the diversion is arranged to take place along the length of the conveyor the bundles may be allowed to pass through the diverter station without diversion.

Again it is an object to enable such units to be fed from either direction to a diverter station located intermediate the length of a main conveyor line, and to be diverted to either side of the main conveyor according to a predetermined sequence, or if desired, to be allowed to pass through the diverter station irrespective of the direction in which the bundle is travelling.

Still another object is to enable the role of side conveyors and main line conveyor line to be interchanged if desired, and a further object is to enable units to be elevated as well as diverted at the diverter station if desired.

From the foregoing it will be apparent that the invention is concerned with the provision of a conveyor system employing standard roller slat conveyors which will afford an almost unlimited flexibility of conveyor distribution not heretofore possible.

According to the invention there is provided at the end or along the length of a roller slat conveyor a diverter mechanism comprising means to arrest feed of the bundle, article, object or the like travelling as a unit, in position to be diverted, means responsive to the advance of a unit to such position to halt or interrupt feed of a subsequent unit to such position, and means to latterly divert a unit reaching such position.

More particularly according to the invention, the means to divert the unit comprises a unit engaging diverter member reciprocally mounted to move transversely from one side to the other of the conveyor, and power operated means are provided to reciprocate the unit engaging member.

Further according to the invention, means are provided to accelerate a unit approaching the diverter station to move it rapidly into position to be diverted whereby the accelerated unit is separated from following units, enabling the following units to be halted clear of the diverter member. More specifically, in this regard the unit accelerating means comprises a brake shoe device arranged to move into and out of contact with the underside of the roller slats of the conveyor arriving adjacent to the diverter station.

As aforesaid, according to the invention, diversion may be arranged to take place at any point along the length of a conveyor line, and further according to the invention, the conveyor line may comprise a single continuous roller slat conveyor extending through the diversion station or may comprise separate roller slat conveyors extending on opposite sides of the diversion station, and it is a feature of the invention to employ as the unit halting means a brake shoe device arranged to move into and out of contact with the upper side of the roller slats arriving adjacent to the diverter station whereby feed of units or the like can be halted without interrupting conveyor feed regardless of whether or not the conveyor extends continuously through the diversion station.

A further important feature resides in coupling the operation of the unit accelerating means, the unit arresting means, the means for halting feed of subsequent units, and the power operated unit engaging diverter member into a control system whereby unit diversion is automatically effected by means of the control system.

According to the invention, the control system includes a diversion selector control for preselecting the manner in which the units, articles or objects are diverted according to the various applications of the invention. For instance, where the diversion station is arranged at the end of the feed conveyor, the selector control is adapted to be set to provide a sequence of operations in the control system to divert units either alternately to one side and then the other side, or all to one side, or all to the other side as required.

In another application of the invention, where diversion may be desired to take place along the length of a main conveyor feed line, the units may be fed in opposite directions from opposite sides of the diverter station to be diverted all to one side of the conveyor, or, alternately to one side and then the other, or the main conveyor feed line may be arranged to feed units through the diverter station without diversion as selected by the selector control of the control system.

Another feature of the invention resides in providing a sensing or detector mechanism associated with the control system whereby with the diverter station located along the length of the conveyor feed line, the units arriving from one direction may be diverted to one or other of the sides of the conveyor, or alternately to one side and then the other until an interruption of unit feed from the one direction occurs, at which time units arriving at the diverter station from the other direction may then be accepted and diverted as aforesaid until interruption of feed from such other direction occurs.

According to another application of the invention, the main conveyor feed line may be converted into lateral feeders receiving units in a predetermined sequence from what previously were lateral feed conveyors and vice versa.

According to still another application of the invention, diversion of the units may be accompanied by unit elevation to selectively divert the units to discharge points at different elevations.

These and other objects and features will become apparent, and a further understanding of the invention will be had from the following detailed description taken in conjunction with the accompanying drawings, in which:

FIGURE 2 is a partly broken away side-elevational view of the infeed conveyor and part-sectional view of the diverter mechanism taken on the line 2—2 of FIGURE 1;

FIGURE 3 is a partly broken away side-elevational view of the outfeed conveyors and part sectional view of the diverter mechanism taken on the line 3—3 of FIGURE 1;

FIGURE 4 is a schematic diagram of the electrical control circuit of the conveyor assembly of FIGURES 1 to 3;

FIGURE 5 is a schematic diagram of the air circuit of the conveyor assembly of FIGURES 1 to 3;

FIGURE 7 is a part side-elevational, part longitudinal sectional view of the infeed and diverter mechanism;

FIGURE 8 is a vertical section taken on the line 8—8 of FIGURE 7;

FIGURE 11 is a perspective view, partly broken away, of a conveyor assembly according to a further embodiment of the invention, having two infeed conveyors and two outfeed conveyors and a diverter mechanism to laterally discharge from either infeed to either outfeed or discharge;

FIGURE 12 is a part-elevational part longitudinal sectional view on the line 12—12 of FIGURE 11 of the infeed conveyors and diverter mechanism;

FIGURE 13 is a broken away part-side-elevational view of the outfeed conveyors and vertical sectional view through the diverter mechanism on the line 13—13 of FIGURE 11.

FIGURE 14 is a vertical sectional view taken on the line 14—14 of FIGURE 13;

FIGURE 15 is a schematic diagram of the air circuit of the conveyor assembly of FIGURES 11 to 14;

FIGURE 16 is a schematic diagram of the electrical control circuit of the conveyor assembly of FIGURES 11 to 14;

FIGURE 17 is a schematic diagram of the conveyor motor circuits of the conveyor assembly of FIGURES 11 to 14;

FIGURE 19 is a schematic diagram of the electrical control circuit of the conveyor assembly of FIGURE 11;

FIGURE 19A is a schematic diagram of the air circuit of the conveyor assembly of FIGURE 11;

FIGURE 20 is a part broken away side-elevational view illustrating another form of conveyor assembly embodying the invention.

Figure 1:
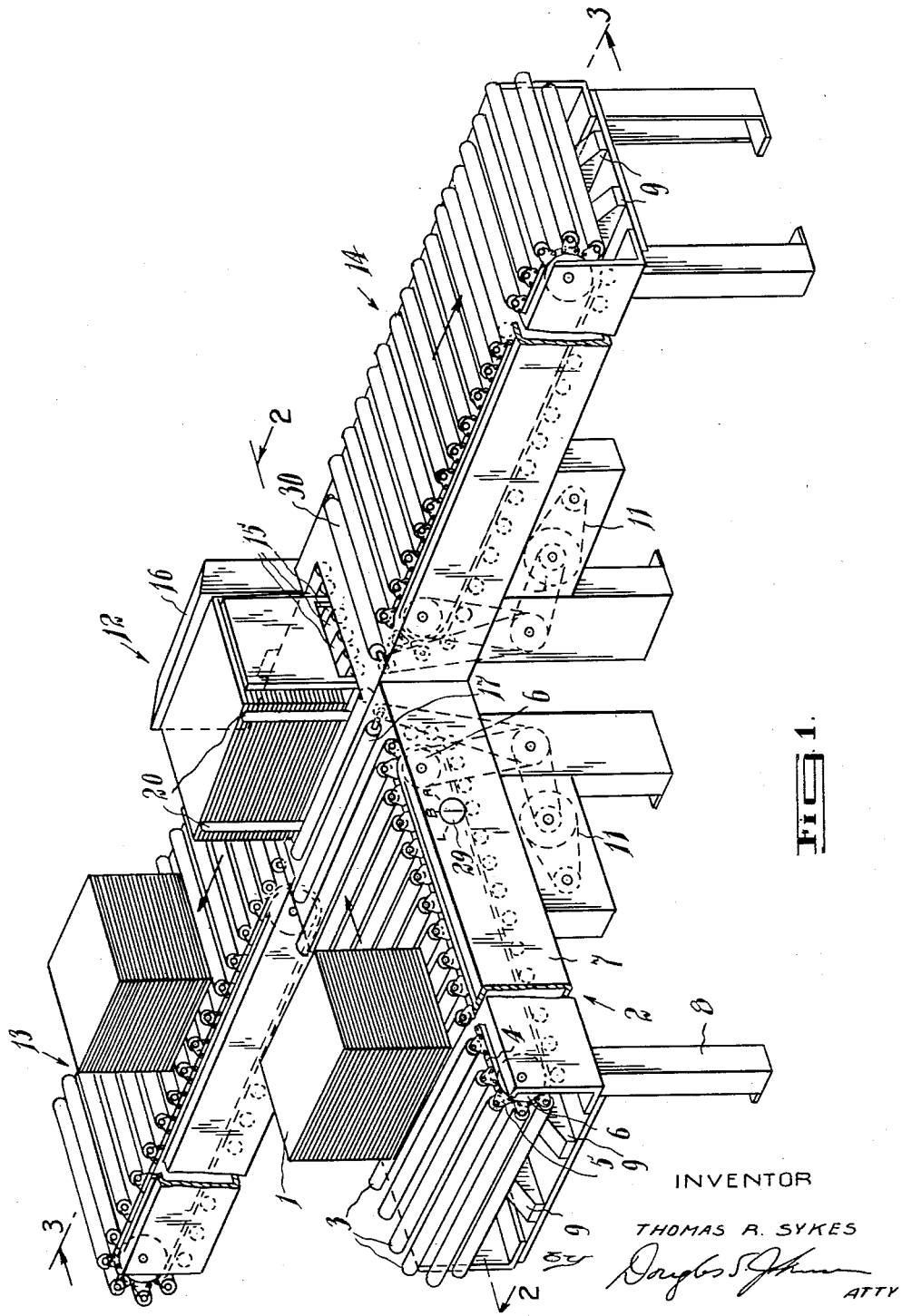
FIGURE 1 is a perspective view, partly broken away, of a conveyor assembly incorporating a diverter mechanism according to one embodiment of the invention, having one infeed and two outfeeds or discharges.
Figure 6:
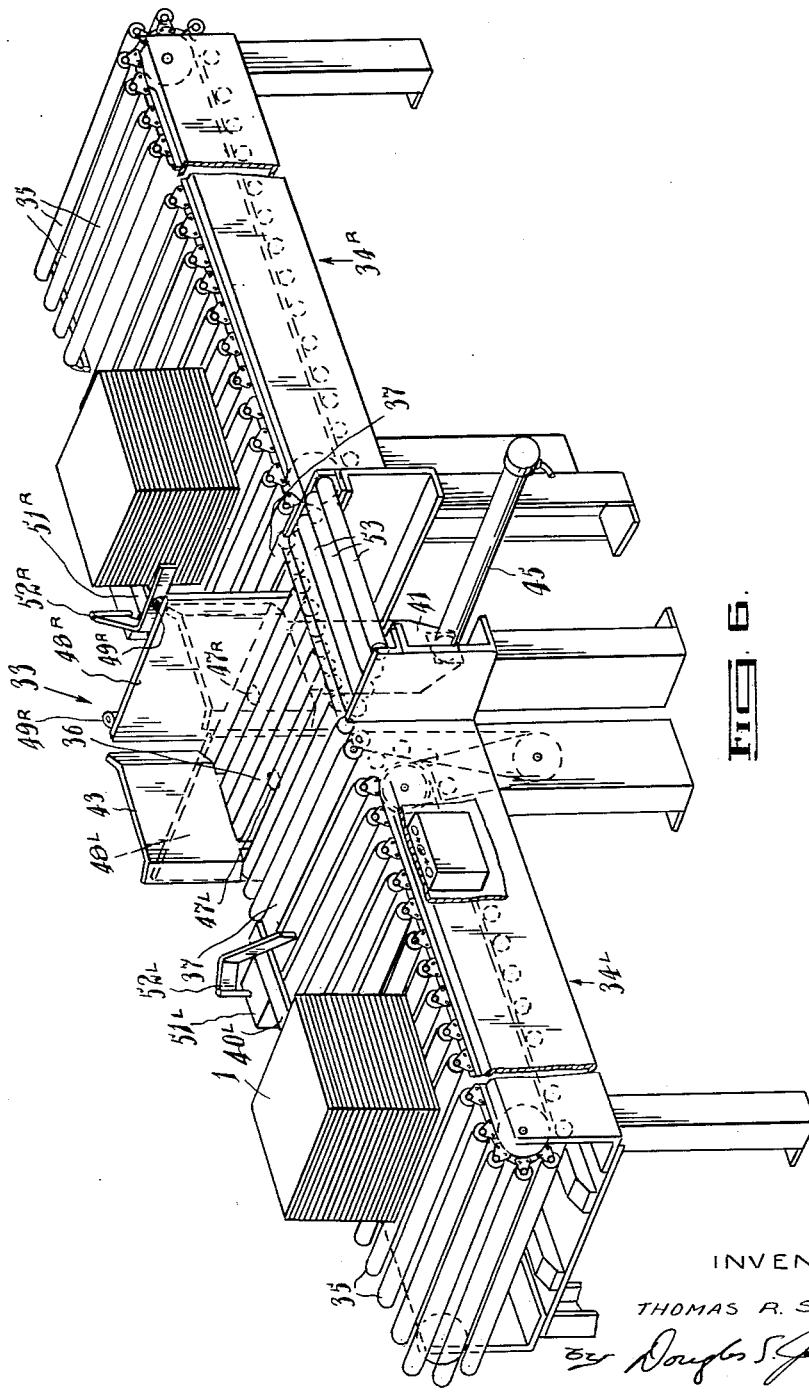
FIGURE 6 is a perspective view, partly broken away, of a conveyor assembly and diverter mechanism according to another embodiment of the invention, and having two infeeds and one outfeed or discharge.

While it will be obvious that there are many applications for the present invention, one example of the use of the equipment is in the handling of untied stacks of newspapers in the newspaper mailing room, the papers travelling as a bundle or unit. For instance, papers are frequently delivered to the mailing room by different paper conveyors, depending on the number of pages being printed and the amount of colour in the newspaper, and then the papers may be fed to a number of different tying machines, and from there may be fed to a large number of different discharge stations. It may frequently happen that one of the pieces of equipment has a failure therein, and it may be necessary to divert the stacks or bundles to an alternative piece of equipment. Again, the rate of feed to one piece of equipment may be higher than the capacity of the equipment to operate on the stacks or bundles, and it is therefore highly desirable to be able to at least temporarily by-pass such overloaded machine.

Referring first to FIGURES 1 to 5 showing one embodiment of the invention in which a single infeed is arranged to selectively divert stacks or bundles travelling as a unit to two lateral outfeeds, it will be seen that the incoming stack 1 of newspapers or the like is advanced by means of a roller slat conveyor 2 such as are commercially available. Such a conveyor comprises an endless series of rollers 3 supported from an endless chain 4 carrying support lugs 5 supporting the rollers 3 for free rotation. The chains 4 are mounted on suitable sprockets 6 supported between side frame member 7 carried by legs 8. Support rails 9 support the lower reach of rolls in their return travel.

The conveyor is provided with a suitable drive 11 providing drive to one of the sprockets 6. The conveyor 2 terminates at a diverting station generally designated at 12, from which the stacks 1 are adapted to be laterally diverted onto either a left outfeed conveyor 13 or a right outfeed conveyor 14, which conveyors again are of conventional construction, and correspond to the construction of infeed conveyor 2.

The diverting station 12 comprises a plurality of rollers 15 which are free to rotate, but are held from translation. A back-stop 16 is provided to stop stacks delivered onto the rollers 15 from the infeed conveyor 2. To facilitate delivery of stacks 1 from the infeed conveyor 2, a positively driven roller 17, driven from the drive 11 is arranged between the end of conveyor 2, and the rollers 15. Further to facilitate entry of a bundle or stack into the diverting station 12, a brake shoe device indicated at 18 in FIGURE 2 is arranged beneath the rollers of the upper reach of the conveyor arriving adjacent to the diverting station, and this brake shoe is adapted to be operated into and out of contact with the under surfaces of the rollers 3 by means of a hydraulic cylinder 19 as hereinafter more fully described.

It will be understood that when the brake shoe 18 is withdrawn from contact with the rollers 3, these rollers will be free to rotate, and the stack or bundle 1 may be physically halted on the conveyor at this point without interrupting the operation of the conveyor, since the rollers will be free to turn underneath the stack. However, if the brake shoe 18 is moved up into engagement with the undersurfaces of the rollers arriving at the brake shoe, the upper surfaces of the rollers will have a velocity of twice conveyor speed, and the bundle will be accelerated into the diverting station. A fuller explanation of the function of the brake shoe device to create feed acceleration will be found in co-pending United States application Serial No. 527,031, now Patent No. 2,959,273.

Between the positively driven roller 17 and the stationary rollers 15, which form a roller platform, there are arranged a pair of hydraulically operated stack or bundle stops 20 which are arranged to project upwardly into the path of a stack or bundle during the period that the diverter mechanism hereinafter described is carrying out its diverting cycle. When the diverting mechanism has cleared a previous stack and is prepared to divert a subsequent stack, the bundle or stack stops 20 will be retracted out of the path of subsequent incoming stacks.

It will be understood that the brake shoe 18 will be controlled to provide bundle or stack acceleration on the conveyor 2 only when the bundle stops are retracted and the diverting station is awaiting the subsequent bundle. At other times, the brake shoe device will be withdrawn from contact with the rollers 2 to allow the bundle stops to interrupt feed on the infeed conveyor without interrupting conveyor operation.

As will be seen from FIGURES 2, 3 and 5, the bundle stops 20 comprise pistons operating in cylinders 21, the hydraulic feed to which, along with the feed to the brake shoe cylinder 19, is controlled through the control circuit of FIGURE 4.

The diverting mechanism comprises a diverting plate 22 carried on a crosshead 23 which is slidably supported on rods 24 to move the plate transversely of the conveyor 2 from one side thereof to the other side thereof. Reciprocation of the crosshead 23 and diverter plate 22 is effected by means of a hydraulic cylinder 25, the piston rod 26 of which is connected to the crosshead 23.

Associated with the diverter mechanism is a switch 27 arranged to be actuated by the entry of a stack or bundle into the diverting station to set the diverting mechanism into operation. Further associated with the diverting mechanism are switches 28L and 28R, which are arranged to be actuated by the crosshead 23 when the crosshead reaches the limits of its reciprocal travel. Associated with the infeed conveyor 2 is a master control switch 29 having a neutral position indicated at B, a left position indicated at L, and a right position indicated at R, for effecting alternate discharge to conveyors 13 and 14, successive discharge to the left conveyor 13, or successive discharge to the right conveyor 14, respectively.

Preferably, between the diverting station 12 and outfeed conveyors 13 and 14 there are arranged positively driven rollers 30 corresponding to the roller 17.

Referring to the control circuit of FIGURE 4 and the hydraulic circuit of FIGURE 5, the sequence of operation of the mechanism with the master control switch 29 set in the central or double diverting position will now be described.

With no bundle or stack in the diverting station 12 formed by the roller platform 15, the contacts $27_b$ and $27_h$ of switch 27 in circuits B and H are open, the relay $R_1$ is de-energized. At this time, the various relay contacts and switch contacts are in the position shown in FIGURE 4, with the diverter crosshead 23 to the right to actuate the contacts $28R_a$, $28R_d$ and $28R_g$ of switch 28R to their positions shown in circuits A, D and G.

With the coil of relay $R_1$ de-energized, the contacts of this relay, $rl_g$ and $rl_i$, in circuits G and I are open. Since relay contact $rl_i$ in circuit I is open, solenoid S is de-energized and as this solenoid operates a four-way valve 31 in the hydraulic circuit of FIGURE 5 against the action of spring 31' only when it is energized, the valve 31 will occupy the position to which it has been actuated by the spring as shown in FIGURE 5 to supply hydraulic or air pressure to the brake shoe cylinder 19 to apply the brake shoe against the underside of the rollers 3 of the infeed conveyor 2, and to simultaneously apply hydraulic or air pressure to the cylinders 21 of the stack or bundle stops 20 to retract the stops out of the path of an incoming bundle.

Inasmuch as the crosshead 23 is removed from the switch 28L, the contacts $28L_c$, $28L_e$ and $28L_g$ of this switch will be in their normal position, that is, its contacts will be open in circuits C and E, and closed in circuit G. Because the contacts $28L_e$ are open in circuit E, relay $R_2$ will be de-energized and its contacts $r2_c$ and $r2_d$ in circuits C and D will be open and its normally closed contact $r2_a$ in circuit A will be closed. Since the diversion selector switch is in position to effect alternate diversion, the contacts $29L_c$ and $29L_f$ associated with the left diversion position L of switch 29 and the contacts $29R_a$ and $29R_f$ associated with the right diversion position R of switch 29 will be open throughout. As a result, it will therefore be seen that neither solenoid SL in circuit A, nor solenoid SR in circuit C will be energized, and as these solenoids are arranged to operate a four-way valve 32 in the air circuit of FIGURE 5, once each time they are energized to control the operation of diverter cross head piston 26, the piston 26 will be in the position to which it has last been actuated. As shown in FIGURE 5, the piston 26 is in its right hand position to actuate right hand limit switch 28R.

With the control circuit in the above described condition, a bundle 1 being fed along the infeed conveyor 2, upon reaching the rollers 3 above the brake shoe device 18 will be accelerated at approximately twice conveyor speed over the positively driven roller 17 and onto the rollers 15, forming the diverter platform, until it strikes switch 27 and is stopped by the backstop 16. Upon closing the contacts $27b$ and $27h$ of switch 27 in circuits B and H, it will be understood that in circuit H relay $R_1$, that is, the coil of the relay, will be energized closing its contacts $rl_g$ and $rl_i$ in circuits G and I, energizing solenoid S, and this solenoid will actuate valve 31 against the action of spring 31' to reverse air flow to the bundle stop cylinders 21 to raise the bundle stops 20 and to exhaust the brake shoe cylinder 19 to lower the brake shoe 18.

Thus, the bundle stops 20 will come up into the path of a subsequent bundle on the conveyor 2, and the brake shoe will drop out of engagement with the conveyor rollers so that when a bundle subsequently reaches the bundle stops 20 the rolls can turn harmlessly under the bundle without interrupting conveyor operation. It will be understood that by virtue of the fact that the preceding bundle delivered into the diverting station has been accelerated by the brake shoe device, there will be a separation between such preceding bundle and subsequent bundles being fed along the conveyor 2, so that there will be ample opportunity for the bundle stops 20 to come up into bundle stopping position before the arrival of a subsequent bundle.

By virtue of the closing of the contacts $27b$ of switch 27 in circuit B, solenoid SL will be energized in circuit A through the normally closed contact $r_2$ of relay $R_2$. Energization of solenoid SL will operate four-way valve 32 to the opposite position from that shown in FIGURE 5, and pressure air will be delivered to the right hand end of diverter cylinder 25 to force the diverter cylinder piston 26 and crosshead 23 to the left to force the stack or bundle in the diverting station towards the left in FIGURES 1 and 3 and onto the left hand outfeed conveyor 13.

It will be understood that, as the crosshead 23 leaves the right hand limit switch 28R, the contacts $28R_a$, $28R_d$ and $28R_g$ of this switch will open in circuit A, will close in circuit D, and will close in circuit G.

Thus, before the bundle leaves switch 27, the coil of relay $R_1$ will become locked in on circuit G, and as the bundle is diverted onto the left outfeed conveyor 13, the continued energization of the relay $R_1$ through its locked in contact $rl_g$ on circuit G will maintain solenoid S energized to maintain the bundle stops 20 up and the brake shoe down. It will be understood that the initial operation of the solenoid SL will be sufficient to actuate the valve 32 to provide for movement of the diverter mechanism comprised by the crosshead 23 and diverter plate 22 to the left hand limit position.

When the diverter mechanism has discharged the bundle to the left outfeed conveyor, it will reach the left hand limit switch 28L, actuating same to close the contacts $28L_c$ and $28L_e$ thereof on circuit C and circuit E, while opening its contacts $28L_g$ on circuit G to drop out relay $R_1$. The dropping out of relay $R_1$ will effect the de-energization of solenoid S on circuit I to return the valve 31 to the position shown in FIGURE 5 to effect retraction of the bundle stops 20, and elevation of the brake shoe 18 into roller engagement so that the path will be cleared for advance of a subsequent bundle into the diverting station, and such subsequent bundle will be separated from the following bundles and accelerated from the infeed conveyor into the diverting station.

At this action is occurring, the closing of the limit switch contact $28L_e$ on circuit E will energize relay $R_2$, that is, the coil of this relay, to open relay contact $r2_a$ in circuit A, to close the normally open contacts $r2_c$ in circuit C, and to close the normally open contacts $r2_d$ in circuit D. This action prepares the control circuit for operation of the solenoid SR in circuit C upon the next subsequent bundle entering the diverting station and actuating switch 27. When this occurs, the contacts $27_h$ of switch 27 in circuit H will again energize relay $R_1$ to complete circuit I through its now closed contact to energize solenoid S to again raise the bundle stops and retract the brake shoe to prevent subsequent bundle delivery.

At the same time, solenoid SR will be energized through switch B and the previously closed contact $r_2$ of relay $R_2$ on circuit C. The energization of solenoid SR will reverse the position of valve 32 back to the position shown in FIGURE 5, and the diverter mechanism will be diverted or forced to the right. As soon as movement of the diverter mechanism commences and the left hand limit switch 28L is cleared, the contacts $28L_g$ of this switch in circuit G will again close, and relay $R_1$ will again be locked in on circuit G through the contacts $28R_g$ of the right hand limit switch 28R which are closed at this time and its own contacts $r1_g$ which are still closed under the maintenance of the closure of switch contacts $27_h$ in circuit H during this initial period of bundle movement before the bundle has cleared switch 27.

As the diverter mechanism clears the left hand limit switch 28L, its contacts $28L_c$ in circuit C will again open, but this will have no effect, since contacts $29L_c$ are open and its contacts $28L_e$ in circuit E will open, but this will have no effect since, with the diverter mechanism still away from the limit switch 28R, the contacts $28R_d$ of this latter switch will be closed in circuit D and relay $R_2$ will remain locked in.

Upon the stack or bundle being diverted onto the right hand conveyor 14 at the end of the stroke of the diverter mechanism, the right hand limit switch 28R will, of course, again have been actuated to close its contacts $28R_a$ in circuit A, and to open its contacts $28R_d$ and $28R_g$ in circuit D and G to drop out relays $R_2$ and $R_1$, respectively, and to prepare the control circuit for the subsequent operation of solenoid SL, and re-energization of relay $R_1$. It will be understood that upon relay $R_1$ being de-energized, the bundle stops will come down and the brake shoe will come up, and the next subsequent bundle will be accelerated into the diverting station to again actuate switch 27 closing this switch to now energize relay $R_1$ and solenoid SL to raise the bundle stops and lower the brake shoe to carry out the sequence previously described.

It will be understood that, with the circuit thus set, bundles will be diverted alternately first to one outfeed conveyor, and then to the other outfeed conveyor. Should it be desired, for instance, to feed all of the bundles to the right outfeed conveyor 14, the master control switch 29 will be actuated to close the normally open contacts $29R_a$ and $29R_f$ in circuit A and circuit F respectively. It will thus be seen that, following the diversion of a bundle to the right, such diversion will, upon the diverting mechanism operating the right hand limit switch 28R, have closed the contacts $28R_a$ in circuit A, opened the contacts $28R_d$ in circuit D, and opened the contacts 28R in circuit G. The opening of the contacts $28R_d$ in circuit D will effect the de-energization or dropping out of relay $R_2$. The opening of contacts $28R_g$ in circuit G, however, will have no effect since these contacts will be shorted out by the closed contacts $29R_f$ in circuit F. As a result, relay $R_1$ will remain energized, and the bundle stops will remain up and the brake shoe down when the diverter mechanism reaches the right hand end of its stroke.

However, at this time, by virtue of the closure of contacts $28R_a$ in circuit A, and the closure of contacts $29R_a$ and $29R_f$ on the selector switch, and the closure of contacts $r2_a$ which are normally closed upon the de-energization of solenoid SR, solenoid SL will be energized in circuit A and the diverter mechanism returned to the left-hand end of its stroke without feeding a bundle to the left. At the left hand end of its stroke, however, the diverter mechanism will actuate the left hand limit switch 28L and this will have the effect of opening circuit G, since contact $28L_g$ in this circuit is not shorted out by the selector switch contact $29L_f$ and as a result, relay $R_1$ will be de-energized, de-energizing solenoid S, effecting retraction of the bundle stops and elevation of the brake shoe into roller engagement.

As far as circuit A is concerned, it will be understood that as the diverter again leaves the right hand limit switch 28R, the contacts $28R_a$ of this switch will open on this circuit, and upon switch contacts $27_b$ opening, solenoid SL will be de-energized. When the diverter mechanism hits the left hand limit switch 28L, then relay $R_2$ will again be energized through circuit E, and this will close its contacts $r2_c$ and $r2_d$ on circuit C and circuit D respectively and open its contacts $r2_a$ on circuit A to prepare the control circuit for the next subsequent bundle. Should a bundle not be waiting, the diverter mechanism will remain inactive ready to divert to the right. However, upon such next subsequent bundle striking switch 27 on entering the diverter station, solenoid SR will be energized on circuit C through the now closed relay contact $r2_c$ on circuit C, and the diverting cycle will be repeated.

It will be understood that, if diversion to the left is desired, then the selector switch will be set to close the contacts $29L_c$ and $29L_f$ on circuit C and circuit F. In this event, it will be understood that when the diverter mechanism reaches the left hand end of its stroke to strike limit switch 28L and open its contacts on circuit G, this action will have no effect on relay $R_1$ since the contacts $28L_g$ on circuit G will be shorted out by the now closed contacts $29L_f$ on circuit F. Thus, the bundle stops will remain up and the brake shoe down when the diverter mechanism reaches the left hand end of its travel. At the same time, with contacts $29L_c$ on circuit C closed and $28L_c$ also closed on circuit C, by virtue of the diverter mechanism striking the left hand limit switch, the closure thereby of the left hand limit switch contacts $28L_e$ in circuit E to energize relay $R_2$, closing contacts $r2_c$ in circuit C will effect an immediate energization of solenoid SR in circuit C, without requiring the operation of switch 27. Thus the solenoid SR will effect the return movement of the diverter mechanism to the right immediately after a bundle has been discharged to the left in preparation of discharging a subsequent bundle to the left.

Of course, when the diverter mechanism reaches the right hand end of its stroke, and with the selector switch contacts $29R_g$ and $29R_f$ now open, the opening of the right hand limit switch 28R to open contacts $28R_g$ will open circuit G to de-energize relay $R_1$ and solenoid S to drop the bundle stops and raise the brake shoe to accelerate a subsequent bundle into the diverting station. Also, of course, the opening of the right hand limit switch contacts 28R in circuit D will effect the de-energization of relay $R_2$, opening its contacts $r2_c$ and $r2_d$ in circuits C and D, and effecting the closing of its contacts $r2_a$ in circuit A to prepare the control circuit upon entry of a subsequent bundle into the diverting station to energize solenoid SL for bundle diversion to the left.

Referring to the embodiment of the invention shown in FIGURES 6 to 10, it will be seen that the diverter station generally designated at 33 is disposed between two infeed conveyors 34L and 34R, and arrangement is made for diversion to one side of the conveyor only. Each of the conveyors 34L and 34R correspond in construction to the conveyors 2, 13 and 14 described in connection with the conveyor assembly shown in FIGURE 1. Thus, each conveyor has an endless series of rollers 35 which normally are freely rotatable as they are driven in translation from the respective drive mechanisms.

The diverter station 33 again comprises a series of stationary rollers 36 which form a roller platform and preferably a positively driven roller 37 is arranged between the end of each of the conveyors 34L and 34R and the roller platform 36. The infeed conveyors again include brake shoe devices indicated at 38R and 38L, which are hydraulically operated through the cylinders 39R and 39L to move into and out of engagement with the underside of the rollers 35 arriving adjacent to the diverting station as and for the purpose above described in respect of the brake shoe device 18 of the embodiment of the invention of FIGURES 1 to 5.

In addition, associated with the brake shoe devices 38R and 38L are further brake shoe devices indicated at 40R and 40L, with associated hydraulic cylinders 40R' and 40L′ which are arranged to move into and out of engagement with the upper surfaces of the rollers 35, arriving adjacent to the diverting station, it being understood that the upper brake shoes 40R and 40L are maintained out of engagement with the rollers when the lower brake shoes 38R and 38L are in roller engagement, and vice versa.

When the upper brake shoes 40R and 40L contact the upper surfaces of the rollers 35, they create, in effect, a stationary platform on the conveyor without interrupting conveyor operation. This platform is created by virtue of the fact that the velocity of the upper surfaces of the rollers is reduced to zero on contact with the brake shoe, while, of course, the velocity of the undersurfaces of the rollers is approximately twice conveyor speed. For a more detailed explanation of the functioning of the upper brake shoes, reference may be had to co-pending United States application Serial No. 527,031.

It will be understood that the upper brake shoes 40R and 40L therefore form a means of interrupting stack or bundle feed along the infeed conveyors 34L and 34R respectively while the diverter mechanism is carrying out its diversion cycle. The diverting mechanism again comprises a reciprocally mounted base member 41 slidably supported on suitable guide rods 42 beneath the stationary rollers 36, the base carrying diverter plate 43 extending above the rollers 36. The base member 41 is secured to the piston 44 of a hydraulic cylinder 45, which is arranged to reciprocate the diverter between the limit positions shown in solid and dotted lines in FIGURE 8, at which positions limit switches 46i and 46o are actuated respectively.

Associated with the roller platform 36 are a pair of bundle detector switches 47R and 47L. In addition associated with the roller platform are bundle stops 48R and 48L, which are operated by means of pistons 49R and 49L of hydraulic cylinders 50R and 50L up into the path of a bundle above the platform rollers, or retracted to a position below the platform rollers according to desired diverter operation, as hereinafter more fully described.

Associated with the left conveyor 34L is a stack or bundle detector switch 51L which is provided with an arm 52L projecting into the path of a bundle being fed along the conveyor, whereby the bundle on striking the arm actuates the switch. The right hand conveyor 34R is provided with a similar switch 51R, and arm 52R.

Figure 9:
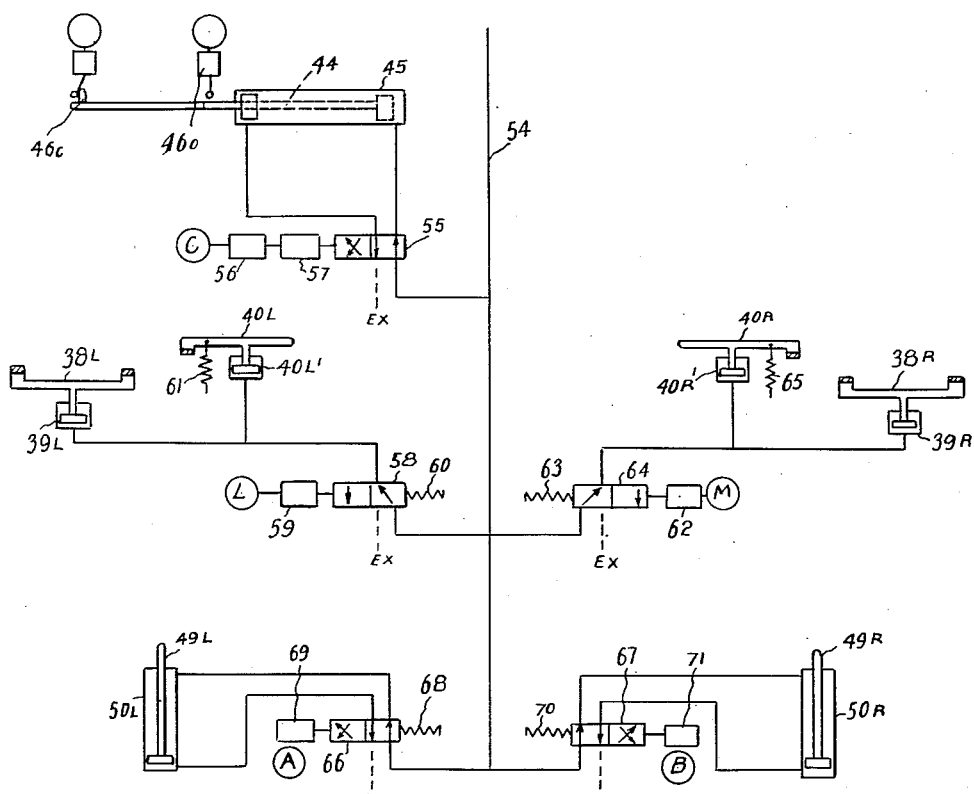
FIGURE 9 is a schematic diagram of the air circuit of the conveyor assembly of FIGURES 6 to 8.
Figure 10:
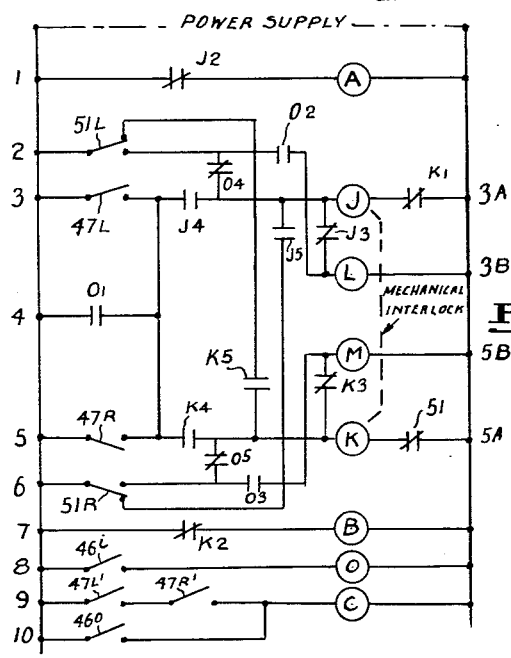
FIGURE 10 is a schematic diagram of the electrical control circuit of the conveyor assembly of FIGURES 6 to 8.

FIGURES 9 and 10 illustrate the air circuit and the electrical control circuit, respectively. The electrical control circuit illustrates the various switch components in the position which they occupy with the bundle diverter actuated to the "in" position shown in solid line in FIGURE 9, ready to divert a stack or bundle out of the diverting station onto the discharge rollers 53. Prior to energizing the control circuit of FIGURE 10, it will be seen, therefore, that pressure air through air feed line 54 is delivered through a four-way valve 55 to the diverter cylinder 45 to extend the diverter piston 44 to the position illustrated in FIGURE 9.

Arranged to operate valve 55 is a solenoid C which, with its associated plunger and air index 56 and 57, respectively, moves the valve 55 during the period that its coil is energized to a position to admit air to the appropriate end of the diverter cylinder 45, that is, each time the solenoid C is energized, the valve reverses, the valve being shown in position ready to move the diverter mechanism through its diverting cycle after energization of the solenoid C through the electrical control circuit.

The operation of the left lower brake shoe 38L and the left upper brake shoe 40L is effected by means of valve 58 operated by solenoid L and its associated plunger 59. The solenoid L acts against spring 60 and when deenergized, allows the spring to move the valve 58 to the position shown in FIGURE 9 to raise the left brake shoe device 38 against the underside of the conveyor rollers 35 and to raise the left upper brake shoe 40L against the action of spring 61 out of contact with the upper surfaces of the rollers so that, with the brake shoe devices in this position, a bundle or stack being fed along the left hand conveyor will, upon reaching the vicinity of the diverter station, be accelerated into the station.

The right hand lower brake shoe and upper brake shoe devices 38R and 40R are controlled through a corresponding solenoid M with plunger 62 acting against spring 63 to move a four-way valve 64 from the biased position illustrated in FIGURE 9, which again applies air to raise the lower brake shoe device 38R and to raise the upper brake shoe device 40R against the action of spring 65.

The bundle stops 48L and 48R are controlled by means of four-way valves 66 and 67, respectively, the valve 66 controlling the left-hand bundle stop being normally biased by spring 68 to the position illustrated in FIGURE 9, and being adapted to be moved to the air flow reversing position upon energization of the solenoid A and associated plunger 69. Similarly, the valve 67 controlling the right-hand bundle stop is normally urged into the bundle retracting position as illustrated in FIGURE 9 by the spring 70, but is arranged to be reversed upon energization of the solenoid B and its associated plunger 71 to the position to project the right-hand bundle stops into the path of a bundle.

With reference to the control circuit of FIGURE 10, it will be seen that when power is first turned on solenoid A in circuit 1 will be energized through normally closed contacts J2 of a left backstop relay J, arranged in circuit 3. Similarly, solenoid B will be energized in circuit 7 through normally closed contacts K2 of a right backstop relay K in circuit 5. De-energization of the two solenoids A and B will effect reversing of the valves 66 and 67 to bring up the backstop pistons 49L and 49R carrying the bundle stops 48L and 48R respectively, and the path of bundles or other units approaching the diverter station from either direction will be blocked.

Suppose now, a stack of newspapers, for instance, moves along the left conveyor 34L towards the diverter station. It will strike the arm 52L of the detector switch 51L, closing switch 51L in circuit 2. As a result, relay J will be energized through normally closed contacts O4 of a diverter relay O in circuit 8, it being understood that when the diverter relay O is de-energized, contacts O4 will be closed.

Upon energization of relay J, comprising the left backstop relay, its contacts J1 in circuit 5, J2 in circuit 1, and J3 between circuits 2 and 3, will open, these contacts being normally closed with the relay de-energized, and its contacts J4 in circuit 3 and J5 in circuit 6 will close. As a result of the closure of contacts J5, the relay J will lock itself in on circuit 6, and this circuit will not be interrupted until a stack travelling inwardly on the right-hand conveyor operates switch 51R.

The opening of the contacts J1 in circuit 5 will render the right backstop relay inoperative, preventing its coil from being energized by any subsequent switch operation, while relay J is energized. Also, the opening of contacts J3 between circuits 2 and 3 will de-energize solenoid L so that the subsequent operation of the switch 51L will not energize the solenoid L to apply the top brake shoe 40L and stop the bundle.

The contacts J4, upon closing in circuit 3, will allow the left table detector switch 47L to function when required. Contact J5, on closing, will connect the normally closed contact on switch 51R of the right bundle or stack detecteor switch in circuit 6 through to circuit 3, for a purpose to be described.

As the stack moves into the diverter under the acceleration imparted thereto through the braking action of the left bottom brake shoe 38L, it closes switch 47L in circuit 3, and this maintains power on relay J after the switch 51L becomes de-energized upon the stack clearing the switch arm 52L. Switch 47L is the left table stack switch, and switch 47R is the right table stack switch, and as the stack moves fully into the diverter station, the contacts of this right table stack switch will close on circuit 5, but since relay K is locked out by de-energization of relay J, the closing of switch 47R in circuit 5 will still be incapable of effecting energization of this right backstop relay K.

Once the stack has actuated switches 47L and 47R in circuits 3 and 5, secondary contacts 47L' and 47R' will close in circuit 9, energizing the diverter valve solenoid C to move the valve to the position shown dotted in FIGURE 9 to drive the diverter outwardly to push the stack off the stationary diverter rollers 36 onto the discharge rollers 53. As the stack is pushed off, switch contacts 47L' and 47R' in circuit 9 open and de-energize solenoid C. As the diverter reaches the end of its stroke, it closes the outer limit switch 46o in circuit 10, which again energizes the solenoid C of the diverter valve, and this results in reversing the air valve and returning the diverter plate 43 to the back position ready to repeat a diverter cycle.

Meantime, as soon as the diverter starts to move, it closes switch 46i in circuit 8, energizing a diverter relay O, which through contacts O1 in circuit 4 applies power to coil J so that when the stack has left switches 47L and 47R, the relay will continue to hold in. When the diverter returns to its back position, switch 46i opens and relay O also opens, disconnecting the power from this source to relay J. However, if there is no bundle waiting on the right hand conveyor, switch 51R will be in its normal position as shown in circuit 6, and this will continue to supply power to relay J, leaving it locked up and the left backstop down.

In the meantime, when relay O closes, it opens contacts O4 and closes contacts O2 in circuit 2, allowing power to reach solenoid L with switch 51L closed, even if the contacts J3 are open. Thus, if a second stack is following the first, it will close switch 51L and energize solenoid L, allowing the left top brake shoe to stop the stack until the diverter has returned to back position.

In the meantime, if another stack has entered the right hand conveyor, switch 51R in circuit 6 will be closed, and as soon as relay O opens, relay J will drop out if there is not another stack on the left conveyor 34L actuating switch 51L. If there is a stack on the left conveyor actuating switch 51L, then the relay J will hold in and the left stack will be accepted before the right stack. If there is no stack actuating switch 51L, then the relay J will drop out, and relay K will close, reversing the backstops, and the stack from the right hand conveyor will then be free to enter the diverter station.

Thus, the backstop last brought down will stay down until a stack comes in from the other side, and this will prevent too frequent operation of the backstops 48L and 48R. It will be understood from the above description that when stacks or bundles arriving on the left conveyor 34L are being diverted, the right backstop relay K cannot be energized, so that the right backstop valve solenoid B is continually energized in circuit 7 to maintain the right bundle or backstop 48R up, and while this stop is up, should a bundle arrive on the right conveyor 34R to the point of the brake shoe devices 38R and 40R, the right stack switch 51R will be closed on circuit 6, energizing solenoid M during the period that the diverter relay O is non-energized through the normally closed contacts O5 between circuits 6 and 5, and K3 between circuits 5 and 6.

The energization of solenoid M will effect application of the top right brake shoe 40R and retraction of the bottom right brake shoe 38R to maintain bundle feed halted on the right conveyor. When diverter relay O is energized as above described, its contacts O3 will close on circuit 6, and with the bundle operating switch 51R as above described, the solenoid M will continue to be energized, this time through the now closed contacts O3. This condition will continue to exist to prevent feed on the right hand conveyor while the diverter is continuing to divert stacks from the left hand conveyor until the interruption of feed on the left hand conveyor as above described.

It will be understood that when there is a break in the feed on the left hand conveyor, dropping out the relay J, then if there is a bundle or stack actuating the right hand bundle detector switch 51R, right backstop relay K will be energized through the normally closed contacts O5 and J1, and the energization of this relay will lock out relay J by opening the contacts K1 in circuit 3–3A. At the same time, relay contacts K2 in circuit 7 will open to de-energize right backstop valve solenoid B to drop the right backstop, the contacts K3 will open to de-energize right brake shoe valve solenoid M to reverse the action of the right brake shoes raising the upper brake shoe 40R and moving the lower brake shoe 38R into engagement with the underside of the rollers 35 to effect bundle acceleration into the diverter station from the right conveyor.

Also, the contacts K4 will close in circuit 5 so that on closing of the right table stack switch 47R, power will be fed directly on circuit 5 to the relay K. Further, contacts K5 between circuit 2 and circuit 5, will be closed providing another path for power to relay K as long as the left stack switch 51L remains unactuated by the presence of a bundle on the left conveyor to maintain relay K energized until such occurrence. Thus, when energized to operate to divert bundles from the right, the diverting cycle will be carried out as above described until such time as there is a break in the feed on the right conveyor, while the bundle is waiting on the left conveyor.

The application of the invention to enable diversion from two infeed conveyors selectively to two outfeed conveyors or to allow feed through the diverting station is illustrated in the embodiment of the invention depicted in FIGURES 11 to 17.

Referring first to FIGURE 11, there is shown a left infeed conveyor 72L and a right infeed conveyor 72R, a left outfeed conveyor 73L, and a right outfeed conveyor 73R. The diverter station, generally designated at 74, is disposed between and in alignment with the aligned infeed conveyors 72L and 72R, and comprises a plurality of stationary rollers 75, which, as in the previous embodiments, have their axes transversely of the infeed conveyors, that is, parallel to the axes of the rollers 76 of the conveyors 72L and 72R. It will be understood that the conveyors 72L, 72R, 73L and 73R are of the same construction as the conveyor 2 of FIGURE 1.

As shown in FIGURE 12 particularly, each of the infeed conveyors are provided with bottom and top brake shoe devices, the bottom brake shoe device of the left hand conveyor being indicated at 77L, and the top brake shoe device being indicated at 78L. The corresponding brake shoe devices of the right hand infeed conveyor are indicated at 77R and 78R. As shown particularly on the air circuit diagram of FIGURE 15, the bottom brake shoe 77L is hydraulically operated by being connected to the piston of hydraulic cylinder 79L while the top brake shoe 78L is actuated by being connected to the piston of hydraulic cylinder 80L acting against spring 81L.

The right hand brake shoe devices have corresponding associated members 79R, 80R, and 81R. As before, at opposite sides of the diverter station 74 are bundle stops 82L and 82R to control the entry of stacks or bundles into the diverter station. Again these devices comprise pistons operating in suitable hydraulic cylinders 83L and 83R.

Again, the diverter mechanism comprises a reciprocal diverter plate 84, which is connected to a crosshead 85, guided by guide rods 86 and the crosshead is actuated by the piston 87 of diverter cylinder 88. Again, preferably, positively driven rollers 89 are arranged between the ends of the conveyors 72L and 72R and the diverter station, and also between the end of the outfeed conveyors 73L and 73R and the diverter station. As before, the diverter is arranged to operate limit switches 90L and 90R at the end of its stroke.

It will be understood that the conveyors 72L and 72R may be arranged to operate to feed in opposite directions inwardly towards the diverter station, or they may be arranged to feed in the same direction to provide a straight line conveyor through the diverter station. With the use of the bottom brake shoes and the positively driven rollers 89, it is possible to accelerate the bundle or stack across the diverter station without power to the rollers 75. However, these rollers may be driven by means of the drive device shown in FIGURES 13 and 14, which comprises a drive motor 91 arranged to drive a belt drive 92 pivotally supported at 93 to be moved into and out of engagement with the underside of the rollers 75 by means of hydraulic cylinder 94.

Associated with each of the infeed conveyors is a bundle detector switch 95L and 95R operated respectively by switch arms 96L and 96R, extending outwardly over the conveyors 72L and 72R respectively.

The air circuit of FIGURE 15 is basically the same as the air circuit of FIGURE 9, with certain additions thereto. The components of the air circuit of FIGURE 15, where not otherwise identified therefor, have been given primed reference numerals corresponding to the reference numerals of the corresponding parts in FIGURE 9. Similarly, the electrical control circuit of FIGURE 16 is basically identical with the control circuit of FIGURE 10, with certain additions thereto, and again the components in FIGURE 16 which are not otherwise designated have been given primed numerals and letters corresponding to the numerals and letters of the corresponding members of the circuit of FIGURE 10.

The additions to the air circuit of FIGURE 15 comprise additional valves 97L and 97R operated separately upon energization of solenoids P' and Q' and their associated plungers 98L and 98R against the action of springs 99L and 99R to control the bottom brake shoes of the infeed conveyors separately from the top brake shoes. Further, the air circuit includes the hydraulic cylinder 94 of the table roller belt drive 92 and this cylinder unit is controlled through hydraulic valve 100 actuated by solenoid R' and its plunger 101.

The additions to the electrical control circuit comprise an on-off diverter switch N', the solenoids P', Q' and R', and a solenoid S' for controlling the energization of the belt drive motor 91 in the circuit of FIGURE 17.

In addition, the relay J' corresponding to relay J of FIGURE 9 includes further contacts J6', J7', and J8', and relay K', corresponding to relay K of FIGURE 9 includes additional contacts K6', K7', and K8'. Further in circuit 8' corresponding to circuit 8 of FIGURE 9, additional switches T1', U1', and 90R2 are added. A further switch U2' in circuit 10' has been added, and new circuits 11', 12' and 13' and the various switch components therein have been added, together with a selector switch V' to provide for diversion of the left conveyor 72L to the right or front outfeed conveyor 73R and the right infeed conveyor 72R to the left or back outfeed conveyor 73L.

It will be understood that the diverter station comprising the roller platform 75 will be provided with the bundle detector switches 102L and 102R, corresponding to the switches 47L and 47R and secondary contacts 102L2 and 102R2, corresponding to the contacts 47L' and 47R'. The functioning of the conveyor assembly or system of FIGURE 11 will now be described with reference to the air and circuit diagrams of FIGURES 15, 16 and 17.

It will be understood that when the diverter is to be employed, switch N' will be closed to the left as illustrated. When switch N' is moved to its right hand position, power is cut off from the diverter controls and is applied to the solenoids R', P' and Q' to operate their respective valves in the air circuit, and solenoid S' of a motor starter. Solenoids P' and Q' operate the three-way valves 98L and 98R respectively on the bottom brake shoes 77L and 77R of the infeed conveyors, and when energized, cut off the air supply to the bottom brake shoes and exhaust the brake shoe cylinders 79L and 79R, thus dropping these bottom brake shoes. At the same time, solenoids M' and L' on the upper brake shoe valves 64' and 48', respectively, are de-energized by virtue of the opening of the power supply through switch N', and thus air is applied to the top brake shoes 78L and 78R to lift these brake shoes.

Thus, the right and left conveyors 72L and 72R are free to operate as normal roller slat conveyors without any brake shoes.

At the same time, energizing solenoid R' applies air to the air cylinder 94 which actuates the belt drive 92 about its pivot 93 into engagement with the bottom surfaces of the rollers 75 of the diverter platform or table. Energizing solenoid S' connects the motor 91 driving this belt to one of the conveyor motor circuits, and thus as the conveyor is started the belt drive will also operate and drive the table rolls.

As indicated in FIGURE 17, the left hand conveyor motor 103L and the right hand conveyor motor 103R and the diverter table drive motor 91 are shown as three-phase motors, and it will be seen that the conveyor motors and the diverter table drive motor are so connected in the motor circuitry that the diverter station or table roller 75 will run in the same direction as the conveyors 72L and 72R regardless of which direction the conveyors are operated.

Thus, through a suitable selector switch 104, FIGURE 11, controlling switches 105L1 and 105L2, and 105R1 and 105R2, through coils 106L1 and 106L2, and 106R1 and 106R2, the conveyor assembly may be arranged to form a continuous conveyor operating through the diverter station, either from left to right in FIGURE 11, or vice versa. In each case, the table or diverter station rollers 75 will be operated in the correct direction to feed the stack or bundle through the diverter station, and of course, as above described, the brake shoes will be out of braking engagement with the conveyor rollers and the bundle stops will be retracted clear of the path of the bundles.

When it is desired to divert employing a system when the bundle stops are to be brought up at the same time as the upper brake shoes are applied to provide two separate means of interrupting feed on the conveyors and preventing entry of a stack into the diverter station until the previously delivered stack has been diverted, contacts J6' and K6' of relays J' and K' have been provided. In operation, consider a stack or bundle being fed on the left conveyor 72L. As this bundle approaches the diverter station it will operate detector switch 95L in circuit 2' to engage its lower contact and the bundle or backstop relay J' will be closed, de-energizing solenoid A' by opening the contacts J2' and the left back or bundle stop 82L will come down.

Once the bundle or stack has moved past switch 95L, this switch will return to engage its upper contact as illustrated in FIGURE 16, but solenoid L' will not be energized, and also solenoid A' will not be energized. If a new stack is fed along the left infeed conveyor 72L to the position of the switch 95L, this stack will again actuate switch 95L, and if the previous stack is still in the diverter, limit switch 90L will be closed, relay O' will be closed, and power from switch 95L will go through the normally open contacts O'2 directly to solenoid L', and also through the normally open contacts J6', which are now closed, to solenoid A' and thus the left upper brake shoe 78L will come down and the left bundle or backstop 82L will go up to provide the dual means of stopping feed on the left infeed conveyor into the diverter station.

It will be understood that if it is desired to omit the upper brake shoe device as a means of interrupting feed on the infeed conveyor and to rely on the left bundle stop 82L when it is not functioning as a backstop for bundles being received from the right infeed conveyor to act as a feed interrupter on the left infeed conveyor, then normally closed contacts J3' can be omitted and contacts J6' can be removed, and the connection made directly. Thus, with the machine at rest and the stack entering from the left conveyor, the left back or bundle stop 82L will be up, solenoid L' will be energized, and the bottom brake shoe will be down. When the stack hits the arm of switch 95L to close this switch, relay J' will close and contacts J2' will open, bringing down the left backstop and applying the left brake shoe to accelerate the bundle into the diverter station.

As soon as the stack has left the switch 95L it will open, but the brake shoe will be left up and the backstop down. When the diverter starts to move the bundle out of the machine, relay O' will close, closing normally open contacts O2' and opening normally closed contacts O4', but there will still be no power to either the left hand backstop or brake shoe valve, and they will remain as they are in the up and down positions, respectively, unless a new bundle arrives on conveyor 72L to again operate switch 95L. This action will then take off the left bottom brake shoe 77L and bring up the left bundle stop 82L to prevent the subsequent bundle entering the diverter with the diverter mechanism away from the home position.

As soon as the diverter has returned to its home position, the backstop 82L will drop, and the brake shoe 77L will be applied, accelerating the new bundle into the diverter. In the same way, control of bundles arriving on the right infeed converter 72R will be controlled so that when the diverter is not in the position to accept bundles coming in from the right, the right backstop 72R will be up, and the right bottom brake shoe 77R will be down.

The conveyor assembly of FIGURE 11 can be operated to take stacks or bundles arriving on either infeed conveyor and divert them to the right or front or to the left or back, or alternatively, to the right and left as desired, according to the setting of the three-position selector switch W.

The contacts T1' and T2' and U1' and U2' of this switch will operate as follows: In the divert right or front position, contacts T1' will be open, contacts T2' will be open, and contacts U1' and U2' will be closed. In the divert alternate position, contacts T1' will remain open, contacts T2' will remain open, contacts U1' will open, and contacts U2' will open. In the divert left or back position, contacts U1' will remain open, contacts U2' will remain open, contacts T1' will close, and contacts T2' will close.

FIGURE 16 has these contacts of the selector switch W set for diversion to the right or front. It will noted in circuit 8' that contacts 90R2 are closed when contacts 90R are open in circuit 10' and vice versa. It will also be noted that circuit 11' contains the contacts 90L2, which are closed when 90L is open, and vice versa. It will thus be seen that in circuit 8', regardless of the position of switch 90R2, the circuit remains the same as it previously was as long as contacts U1' are closed, and also circuit 11' remains inoperative as long as contacts T2' are open. Thus, the diverter will work as above described and divert bundles or stacks from either conveyor to the right or front with the contacts of the selector switch W set as shown in FIGURE 16.

If the selector switch W is set to divert bundles or stacks to the left or rear in the set-up shown in FIGURE 11, then the open contacts of switch 90L in circuit 8' will be shorted out by contacts T1', and contacts 90R2 will be put in circuit, since contacts U1' will be opened. However, contacts 90L2 in circuit 11' will become operative because switch T2' will be closed, and thus the diverter will work exactly as previously described, but will normally return to the right or front position because the limit switch 90R2 at this point replaces the function of limit switch 90L and its additional contacts 90L2 replaces the function of limit switch contacts 90R. Therefore, when the diverter reaches the left or back position, it actuates contacts 90L2, closing them, and thus energizes solenoid C' and reverses the diverter.

When the selector switch W is set to provide alternate diversion, the contacts of both limit switches, that is, contacts 90L and 90R2, will be open in circuit 8' so that the diverter relay O' will only be closed when the diverter is actually moving, and will actually open at each end of the diverter stroke, allowing a new bundle or stack to enter the diverter station.

In circuits 10' and 11' limit switches 90R and 90L2 will both be inoperative because contacts U2' and T2' will be open, and therefore, when the diverter reaches the end of its stroke, it will stay there as there will be no power to solenoid C' to reverse the diverter valve. However, when the new bundle or stack enters the diverter, it will again close switches 102L2 and 102R2 and these switches will allow energy to reach the diverter valve solenoid C', and the diverter valve will reverse and the diverter will move to the opposite side pushing the stack ahead of it. It will, of course, stay in this position until the next bundle or stack arriving at the diverter station again closes switches 102L2 and 102R2.

When it is desired to, for instance, provide bundle or stack diversion from the left infeed conveyor 72L to the front or right outfeed conveyor 73R, and from the right infeed conveyor 72R to the back or left outfeed conveyor 73L, the selector switch V' is closed to include circuits 12' and 13' of FIGURE 16 into the control circuit. Also, the selector switch W will be set so that its contacts are in position to provide alternate diversion. This will cut circuits 10' and 11' out of use. Also, in circuit 8' the diverter relay O' will be maintained energized only so long as the diverter is moving, because contacts T1' and U1' will be open.

Upon a bundle or stack being fed in on the left conveyor 72L to the diverting station, backstop relay J' will be energized as above described, and contacts 90R3 of the front or right diverter limit switch will be shorted out by the closing of the normally open left backstop relay contacts J7' in circuit 12'.

Also, in circuit 13', the contacts 90R4 of the diverter right or front limit switch will become operative because the normally open left backstop relay contacts J8' will close. Thus, the bundle or stack delivered to the diverter station by the left hand conveyor 72L will be diverted to the front or right, and in the absence of a waiting stack on the right hand conveyor 72R the diverter will actuate the contacts 90R4 in circuit 13' to energize the diverter solenoid and return the diverter to the left for the next subsequent bundle.

Suppose, now, a bundle or stack of newspapers is fed along the right conveyor 72R into the diverter station, then relay K' will close when the right bundle detector swit 102R is closed, and as a result of the energization of the relay K', the left diverter limit switch contacts 90L3 in circuit 12' will be shorted out by relay contacts K7'. However, it will be understood that at this time contacts J7' will be open, leaving the control of current flow in circuit 12' to the operation of contacts 90R3.

Also under these conditions, the back or left diverter switch contacts 90L4 will be rendered inoperative since at this time left backstop relay contacts J8' will be open.

On the other hand, the contacts 90L4 of the left diverter limit switch in circuit 13' will be rendered operative, since the contacts K8' of the right backstop relay will be closed. Thus, when the diverter reaches the left hand end of its travel, it will effect closure of limit contacts 90L4, thereby energizing solenoid C', which, in turn, effects the reversal of the direction of travel of the diverter, moving it back to the right or front of the diverter station, so that the next bundle or stack coming in from the right hand conveyor 72R will be automatically discharged to the left or back.

The provision of the circuits 12' and 13' provide the above-described function of diverting bundles fed in on the left conveyor to the front or right and bundles fed in on the right conveyor to the left or rear. It will, however, be understood that another switch similar to switch V' and another set of circuits similar to circuits 12' and 13', but with the positions of the contacts of relays J' and K' reversed, would permit stacks coming in on the left conveyor to be diverted to the left or back, and stacks coming in on the right conveyor to be diverted to the right or front.

It will thus be appreciated that with a relatively simple system of selector switches, bundles, stacks or other items travelling as a unit on the conveyors can be routed according to substantially any desired scheme.

Figure 18:
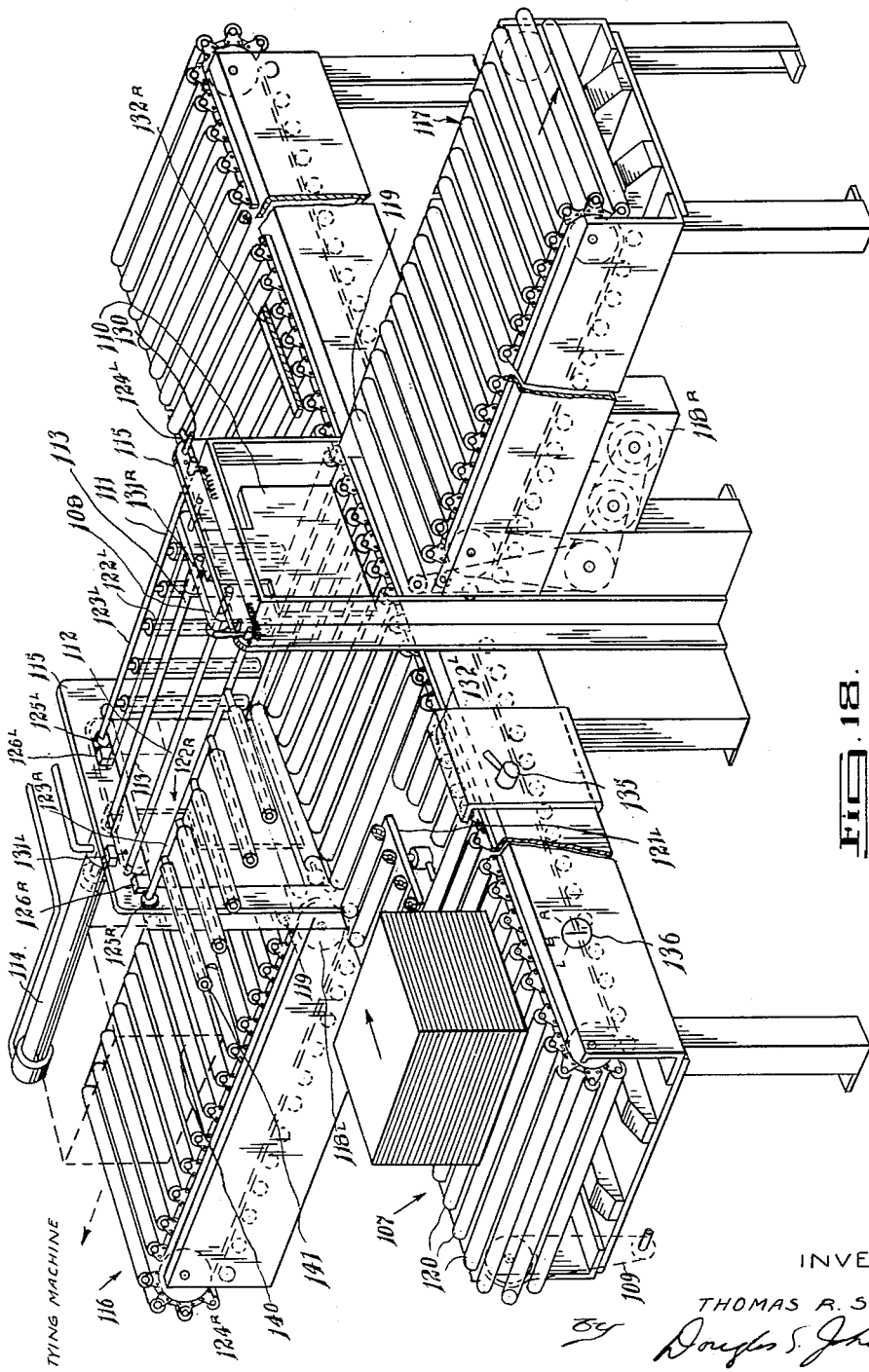
FIGURE 18 is a perspective view, partly broken away, of another embodiment of the invention employing a single infeed conveyor capable of feeding in either direction to a diverting mechanism and two lateral outfeed or discharge conveyors.

Referring to the embodiment of the invention shown in FIGURES 18, 19 and 19A, it will be seen that the infeed conveyor 107 is a single conveyor similar to the conveyor 2 of FIGURE 1, which extends through the diverter station designated at 108. It will be understood that the conveyor 107 may be driven in either direction through the usual drive 109 to feed bundles or stacks of newspapers, for instance, from the left or right.

The diverter mechanism comprises a diverter plate 110, carried by a crosshead 111, slidably mounted on guide rods 112. The diverter is actuated by means of piston 113 of hydraulic cylinder 114, all supported above the conveyor 107 by side frames 115. Bundles arriving in the diverter station 108 are adapted to be delivered either to the left onto rear roller slat conveyor 116, or the right onto front roller slat conveyor 117, both of which, again, are similar in construction to the conveyor 2 of FIGURE 1. These conveyors are arranged to be driven through suitable drives 118L and 118R, and preferably positively driven rollers 119 are arranged between the ends of these conveyors 116 and 117 and the diverter station.

Arranged beneath the rollers 120 of conveyor 107 arriving adjacent to the diverter station 108 from either direction are brake shoes 121L and 121R (the left brake shoe, 121L, only being shown in FIGURE 18). The bundle backstops 122L and 122R comprise rollers supported from overhead of the conveyor 107 by means of rods 123L and 123R. These rods are supported for pivotal movement by means of handles 124 and 124R between depending backstop forming position as illustrated in connection with the backstop 122L for stopping bundles arriving from the left, and a position clear of bundle feed, as illustrated by the position of backstop 122R.

When the backstops 122L and 122R are swung down to the bundle stopping position, cams 125L and 125R are arranged to operate switches 126L and 126R respectively upon a bundle striking such bundle stop and rocking it under its momentum within the limits permitted by the bundle stop position locking pins 130.

Arranged on the frames 115 are diverter limit switches 131L and 131R arranged to be actuated when the diverter moves to the left and to the right, respectively.

Associated with the bottom brake shoes 121L and 121R are top brake shoes 132L and 132R, respectively, which are arranged to be operated by the pistons 133L and 133R of hydraulic cylinders 134L and 134R, which actuate the bottom brake shoes. The arrangement is such that normally when air is applied to raise the bottom brake shoes into engagement with the rollers 120 of the conveyor 107, the upper brake shoes 132L and 132R will be raised clear of roller engagement, and vice versa. If desired, the brake shoes at both the top and bottom may be rendered inoperative upon disconnecting air feed to the cylinders 134L and 134R by means of a mechanical control lever indicated at 135 in FIGURE 18, which will raise the brake shoe device sufficiently to clear the top brake shoes from roller engagement without moving the bottom brake shoes against the conveyor rollers.

With the exception of the fact that the top brake shoes 132L and 132R are employed to interrupt conveyor feed in place of the bundle stops 20 and except for the fact that there are provided two bundle detector switches 126L and 126R in parallel in place of the single bundle detector switch 27, the air circuitry and the electrical control circuitry of the embodiment of the invention of FIGURES 18, 19 and 19A is the same as the embodiment of the invention shown in FIGURES 1 to 5. As before, bundles may be diverted either to the left or to the right, or alternately to the left and right, through setting of selector switch 136, which when set to the right closes contacts 136R$_a$' and 136R$_f$', and when set to the left closes contacts 136L$_c$' and 136L$_f$', the contacts 136R$_a$' and 136R$_f$' and 136L$_c$' and 136L$_f$' remaining open when the switch is set to the alternate divert position.

With the diverter crosshead 111 and diverter plate 110 displaced to the right, as shown in FIGURE 18, to actuate the contacts 131R$_a$', and 131R$_g$' of right limit switch 131R to the positions shown in circuits A', D' and G', the effect of a bundle being fed along the infeed conveyor 107 from left to right will be as follows: Upon the bundle reaching a point above the left lower brake shoes 121L, which is normally elevated, it accelerates the bundle into the diverting station and against the far bundle backstop which serves to stop the bundles arriving from the left and is designated at 122L.

Upon the bundle striking the backstop 122L it will rock this backstop sufficiently so that the cam 125L will close the contacts 126L$_b$' and 126L$_h$' of the bundle detector switch 126L in circuits B' and H'. As a result, relay R1' in circuit G' will be energized, closing its contacts r1' in circuit I', energizing solenoid S2 with the result that valve 137 in the air circuit is actuated against the operation of spring 138 to drop the lower brake shoes and to apply the upper brake shoes 132L and 132R. It will be understood that the left and right brake shoes can be operated in parallel, since when feeding from the left there will be no delivery from the right, and vice versa, and the right hand brake shoes have therefore no bundles to act upon.

The closing of contacts 126L$_b$' in circuit B' energizes solenoid SL' in circuit A' through normally closed contacts r2'$_a$' of a relay R2' in circuit D'. The momentary energization of this solenoid operates a valve 139 in the air circuit 19A to reverse air feed to the diverter cylinder 114 to move the diverter to the left. As the diverter moves to the left it clears the right hand limit switch 131R and before the bundle has been cleared sufficiently to open the contacts 126L$_b$' and 126L$_h$' of the bundle detector switch, the contacts 131R$_g$' of the limit switch 131R will close in circuit G', with the result that relay R1' will be locked in on circuit G', and the solenoid S2 will be continued to be operated to complete the diversion cycle to the left.

Upon the bundle being diverted to the left, it strikes limit switch 131L opening the contacts 131L$_g$' of this switch in circuit G', thus dropping out relay R1', and de-energizing solenoid S2. Upon solenoid S2 becoming de-energized, the valve 137 will reverse and the bottom brake shoes 121L and 121R will be applied and the top brake shoes 132L and 132R released to deliver a subsequent bundle into the diverting station.

Since the diverter is at the left hand position at this time, left hand limit switch 131L will be operated with its contacts 131L$_e$' closed on circuit E' to energize relay R2' in circuit D', with the result that the normally closed contacts r2'$_a$' in circuit A' will be now open, and the normally open contacts r2'$_c$' in circuit C' will be closed. Thus, upon a new bundle entering the diverter station to actuate the switch 126L, a path will be cleared to operate solenoid SR' rather than solenoid SL' to reverse the valve 139 and thus reverse the diverter.

With this arrangement, alternate diversion will take place, but as in the case of the system of FIGURES 1 to 5, the selector switch 136 may be set with its contacts 136R and 136L selectively closed to divert right or to divert left, as explained in connection with the circuit diagram of FIGURE 4.

It will be understood that if it is desired to feed from the opposite direction, the direction of feed from the infeed conveyor 107 will be reversed, the left backstop 122L will be raised and the right backstop 122R will be lowered, but otherwise the circuit operates precisely as above described, since the contacts 126L and 126R of the bundle detector switches are connected in parallel.

To facilitate travel of the bundles out of the diverter station 108, the backstops 122L and 122R are shown as comprising a series of rollers 140 suitably supported on bars 141 so that they are free to rotate and facilitate movement of the bundle out of the diverting station.

It will be appreciated that there are many other applications of the invention in addition to those above described, and FIGURE 20 is a more or less diagrammataic figure illustrating a further application which will provide, in addition to the diverting of the units on the conveyors, the elevation of such units, for instance to superimposed discharge stations such as to superimposed discharge chutes. As before, in feed conveyors 142L and 142R of conventional construction are employed to deliver the stack, article, object or item being fed to the diverter station generally designated at 143, which comprises a roller platform 144 supported from a hydraulic cylinder 145 which can move the platform 144 from the bundle receiving position in the plane of the top reach of the conveyors 142L and 142R to a selected discharge point above the conveyors.

Also supported from the hydraulic cylinder 145 are suitable frame members 146 to support an overhead diverter 147 for sliding movement above the rollers 144 on guide rods 148. The control of the diverter and its construction and associated circuitry may be made to correspond to the overhead diverter device illustrated in detail in FIGURE 18.

Left and right bundle stops in the form of pistons 149L and 149R operating in hydraulic cylinders 150L and 150R may be employed, or if desired, pivotal backstops such as indicated at 122L and 122R in FIGURE 18 may be employed. Also, a suitable brake shoe arrangement as above described in connection with the embodiment of the invention shown in FIGURE 18 may be employed with the infeed conveyors 142L and 142R.

With the incorporation of the diverter station into a hoist or elevator mechanism, as constituted by the hydraulic cylinder unit 145, it will be understood that in addition to achieving elevation of the bundles together with lateral diversion, the whole diverter station may be elevated clear of the conveyors 142L and 142R, and may then be turned through an angle of 90 degrees to constitute a turntable. In such a case, with a diverter station of the nature of that shown in FIGURE 20 used in conjunction with the conveyor set-up such as shown in FIGURE 11, the initial infeed conveyors may become outfeed conveyors and vice versa, through the turntable action of the diverting station.

It will be appreciated that the various electrical and air circuitry for a diverter station such as indicated in FIGURE 20 will be essentially the same as previously described circuitry as will be apparent to those skilled in the art.

While the use of air as a source of power in actuating the diverter mechanism has been found eminently satisfactory, it will be understood that other power operated diverter mechanisms may be used and controlled as required to provide the requisite diversion cycle.

It will be understood that various other modifications and alternatives and arrangements employing the invention may be made without departing from the scope of the appended claims.

What I claim is:

1. In combination with a roller slat conveyor, a diverter mechanism for diverting a stack, bundle, article, object or other items travelling as a unit laterally of the conveyor, said diverted mechanism comprising means to arrest a unit fed by the conveyor into position to be diverted, means mounted for reciprocation transversely of the conveyor for diverting an arrested unit laterally of the conveyor in either direction, reversible means for driving said reciprocal diverting means first in one direction, then on reversing, in the opposite direction, and means for interrupting feed of a subsequent unit to the diverting position until diversion of a preceding unit has been effected and said reciprocal diverting means has moved into position ready to divert such subsequent unit.

2. A diverter mechanism according to claim 1 having a control system including means responsive to the delivery of a unit into said diversion position for actuating said reciprocal diverting means to divert such unit and said feed halting means to halt subsequent units.

3. A diverter mechanism as claimed in claim 2 in which said control system includes means responsive to movement of said diverting means into position to divert a subsequent unit to release said unit feed interrupting means from unit feed interruption.

4. A diverter mechanism as claimed in claim 1, in which means are provided to impart an acceleration to a unit arriving on the conveyor adjacent to the diversion position following the diversion of a preceding unit and movement of said diverting means to said ready position.

5. A diverter mechanism as claimed in claim 4 in which said acceleration imparting means comprises a brake shoe device disposed beneath and movable into and out of engagement with the undersurfaces of the roller slats of said conveyor at a point adjacent to said diversion position, and means controlled by said control system for effecting the movement of said brakes into and out of engagement with said roller slats.

6. A diverter mechanism as claimed in claim 1 in which said unit feed interrupting means comprises a brake shoe device disposed above and movable into and out of engagement with the upper surface of the roller slats of said conveyor at a point adjacent to said diversion position.

7. A diverter mechanism as claimed in claim 1 in which said control system includes a diversion selector control operable to control the cycle of movement of said reciprocal diverting means in moving from a ready position to divert a first unit to a ready position to divert a subsequent unit whereby units can be selectively diverted to either side of the conveyor or alternately to one side and then the other side.

8. A diverter mechanism as claimed in claim 7 in which said diversion position is located at the end of said conveyor and said unit arresting means comprises a stationary stop.

9. A diverter mechanism as claimed in claim 7 in which said diversion position is located intermediately of the length of said conveyor, and said means for arresting a unit at said diversion position is retractible.

10. A diverter mechanism as claimed in claim 9 in which means are provided to retract said retractible unit arresting means.

11. A diverter mechanism as claimed in claim 10 in which said means for retracting said retractible unit arresting means is controlled by said control system.

12. Means for laterally diverting stacks, bundles, articles, objects or other items travelling as a unit on a roller slat conveyor line comprising, in combination with a roller slat conveyor line comprising at least one roller slat conveyor and a drive therefor, means to separate a unit to be diverted from following units, means to arrest a separated unit in position to be diverted, and means to interrupt feed of following units, all without interrupting conveyor drive, and means for diverting a unit arrested in the diverting position, said unit separating means comprising an electrically controlled power operated retractible brake shoe device movable into and out of engagement with the underside of rollers of said roller slat conveyor arriving at a point adjacent to said diverting position.

13. Means as claimed in claim 12 in which said feed interrupting means comprises an electrically controlled power operated device.

14. Means as claimed in claim 13 in which said means for diverting an arrested unit comprises an electrically controlled power operated reciprocally mounted reversible device.

15. Means as claimed in claim 14 including an electrical control circuit comprising switch means responsive to delivery of a unit to said diverting position by said conveyor to operate said electrically controlled devices to retract said brake shoe device out of roller engagement to actuate said feed interrupting device to interrupt feed of a subsequent unit to said diverter position, and to reciprocate said diverter device to latterly divert a unit delivered to said diverting station, and switch means operable upon said diverter device having travelled a distance sufficient to divert a unit out of said diverting position to operate said electrically controlled devices to apply said brake shoe device to the conveyor rollers, to effect operation of said feed interrupting device to permit unit feed, and to halt said diverting device in its cycle of movement whereby the diverter is prepared to divert a subsequent unit delivered to said delivery position.

16. Means as claimed in claim 15 in which said diverter device is mounted to reciprocate between a first limit position at one side of the conveyor and a second limit position at the other side of the conveyor and said last-mentioned switch means comprises a first limit switch arranged to be actuated upon said diverter device reaching said first limit position and a second limit switch arranged to be actuated upon said diverter device reaching said second limit position, with said first and second limit switches being connected in said control circuit to effect reversal of power drive to said diverter device, and at least one of said limit switches being connected to effect said functions of brake shoe application, unit feed and halting of said diverter device.

17. Means as claimed in claim 16 in which both said first and second limit switches are connected in said control circuit to effect said functions of brake shoe application, unit feed and halting of said diverter device, and control switch means are provided to selectively shut out the brake shoe applying, unit feeding and diverter halting functions of either of said limit switch.

18. Means as claimed in claim 17 in which said conveyor is reversible and said unit arresting means comprises a pair of spaced retractable devices disposed one on either side of said diverting position and adapted to be selectively brought into unit arresting position depending upon direction of conveyor feed.

19. Means as claimed in claim 18 in which said pair of spaced retractible devices are electrically controlled power operated devices, and said control circuit includes means responsive to unit traffic on said conveyor to selectively operate said retractible devices.

20. A conveyor assembly comprising a roller slat conveyor having an endless series of rotatably supported rollers, and means for driving said roller series, a roller platform at one end of said conveyor forming a station to receive units from said conveyor for lateral diversion, means for indefinitely arresting a unit delivered to said diversion station from said conveyor, power operated means for diverting an arrested unit, power operated means for indefinitely interrupting unit feed along said conveyor at a point adjacent to said diversion station, and control means responsive to delivery of a unit to said diverter station to actuate said power operated diverting means through a diverting cycle to divert such delivered unit laterally to one side of said conveyor, and to actuate said feed interrupting means to interrupt feed on said conveyor during the diversion cycle of said diverting means.

21. A conveyor assembly as claimed in claim 20 in which said power operated feed interrupting and diverting means are electrically controlled, and said control means comprises a control circuit operatively connected to control said feed interrupting and diverting means, said control circuit having switch means adapted to be actuated by a unit delivered to said diverting station.

22. A conveyor assembly as claimed in claim 21 in which said diverter means comprises a reciprocal device mounted for reciprocation transversely of said conveyor from one side thereof to the other, and adapted to divert any unit present in the diverting station in each direction of its reciprocal movement.

23. A conveyor assembly as claimed in claim 22 in which said control circuit includes selectively operable control means to select the diversion cycle of said reciprocal diverting device for one of the following operations: to divert units to a left unit receiver, to divert units to a right unit receiver, and to alternately divert units to left and right unit receivers.

24. A conveyor assembly as claimed in claim 23 having an electrically controlled power operated brake shoe device disposed to move into and out of engagement with the undersurfaces of rollers of said conveyor arriving adjacent to said diverting station to accelerate units on said conveyor onto the roller platform constituting said diverting station, and said control circuit is operatively connected to control said brake shoe device to remove said brake shoe from roller engagement throughout the diversion cycle of said diverting device.

25. A conveyor assembly as claimed in claim 24 in which said feed interrupting means comprises a power operated brake shoe device disposed to move into and out of engagement with the upper surfaces of rollers of said conveyor arriving adjacent to said diverting station.

26. A conveyor assembly as claimed in claim 25 having a second roller slat conveyor and drive therefor corresponding to the first-mentioned conveyor disposed in longitudinal alignment with said first conveyor and extending from the side of said stationary roller platform opposite to said first conveyor, a second electrically controlled power operated means for interrupting unit feed along said second conveyor corresponding to the first-mentioned feed interrupting means and operatively connected in said control circuit to interrupt feed on said second conveyor towards said diverting station during the diversion cycle of said diverting means.

27. A conveyor assembly as claimed in claim 26 having a second electrically controlled power operated brake shoe device corresponding to the first-mentioned brake shoe accelerating device disposed to move into and out of engagement with the undersurfaces of rollers of said second conveyor arriving adjacent to said diverting station to accelerated units on said second conveyor onto the roller platform, and said control circuit is operatively connected to control said second brake shoe device to remove same from roller engagement throughout the diversion cycle of said diverting device.

28. A conveyor assembly as claimed in claim 27 in which said control circuit includes means to selectively render said first and second feed interrupting means inactive in feed interrupting position, and to selectively render said first and second brake shoe accelerating devices inactive and out of roller braking engagement.

29. A conveyor assembly as claimed in claim 28 in which said last-mentioned control circuit means is responsive to unit traffic on said conveyors.

30. A conveyor assembly as claimed in claim 28 in which said last-mentioned control circuit means comprises a unit detector device associated with each of said conveyors to determine the presence of a unit thereon awaiting delivery to said diverting position, and circuit means included in said control circuit and governed by said unit detector device whereby units arriving from one direction are arranged to be fed to said diverting position and diverted until a gap in unit feed from such direction occurs, whereupon units arriving from the opposite direction are then delivered to said diverting station and diverted until a gap in unit feed from such opposite direction occurs and vice versa.

31. A conveyor assembly as claimed in claim 30 in which said unit arresting means comprises first and second electrically controlled power operated retractible devices associated with said roller platform and operatively connected in said control circuit, the first to move into unit arresting position at a point adjacent to said second conveyor when units are being delivered to said diverting station from said first conveyor, and the second to move into unit arresting position at a point adjacent to said first conveyor when units are being delivered to said diverting station from said second conveyor.

32. A conveyor assembly as claimed in claim 31 in which means are provided to rotate said stationary rollers to drive a unit through said diverting station and said control circuit includes selectively operable means to operate said stationary roller driving means and to simultaneously retract said retractible unit arresting devices, and rendering said unit accelerating and unit feed interrupting means inactive for continuous unit feed along said conveyors and through said diverting station selectively in either direction.

33. A conveyor distribution line comprising at least a first and a second roller slat conveyor, each having an endless series of rotatably supported rollers and reversible drive means for driving said rollers disposed in spaced aligned relation, a plurality of rotatable stationary rollers arranged in the space between and extending transversely to the vertical center plane of said conveyors and forming a roller platform constituting a diversion station intermediate the length of said conveyor distribution line, a pair of electrically controlled power operated retractible unit arresting devices associated with said station and comprising a first arresting device operable independently of said conveyors arranged adjacent to said second conveyor to arrest for an indefinite period units fed to said station from said first conveyor, and a second arresting device operable independently of said conveyors arranged adjacent to said first conveyor to arrest for an indefinite period units fed to said station from said second conveyor, an electrically controlled power operated diverter device for diverting units delivered to said diverting station, and control circuit means operatively connected to control said unit arresting devices and said diverter device independently of the operation of said conveyors to arrest and divert units delivered to said station by said conveyors.

34. A conveyor distribution line as claimed in claim 33 in which said diverter device comprises a reciprocal unit transfer device mounted to travel first in one direction and then in the opposite direction transversely of said conveyors above said stationary rollers in its diverting cycle, and said control circuit includes means responsive to delivery of a unit to said diversion station from either of said conveyors to initiate the diverting cycle of said diverter device.

35. A conveyor distribution line as claimed in claim 34 in which said control circuit includes means responsive to the completion of a diverting cycle by said diverter device to prepare said unit arresting devices for delivery of a subsequent unit to said diverting station.

36. A conveyor distribution line as claimed in claim 35 having first and second electrically controlled power operated unit accelerating brake shoe devices, said first brake shoe device being retractibly mounted to move into and out of braking engagement with the undersurfaces of rollers of said first conveyor arriving adjacent to said station, and said second brake shoe device being retractibly mounted to move into and out of braking engagement with the undersurfaces of rollers of said second conveyor arriving adjacent to said station, said brake shoe devices being operatively connected in said control circuit and said control circuit having means to retract said second brake shoe device from roller engagement when said first brake shoe device is in roller engagement to accelerate a unit from said first conveyor onto said roller platform and against said first unit arresting means and vice versa, and having further means to effect retraction of both said brake shoe means during the diverting cycle of said diverter device.

37. A conveyor distribution system as claimed in claim 36 having circuit means connected in said control circuit and responsive to unit traffic on said conveyors to control said unit arresting devices.

38. A system as claimed in claim 36 in which said latter circuit means comprises a first unit detector associated with said first conveyor and adapted to be actuated upon a unit arriving on said first conveyor adjacent to said diverting station, and a second unit detector associated with said second conveyor and adapted to be actuated upon a unit arriving on said second conveyor adjacent to said diverting station, said first and second detectors being connected to actuate said first and second unit arresting means respectively on unit detection to project said unit arresting means into unit arresting means into unit arresting position and said detectors being interconnected whereby the first actuated detector renders the other detector inoperative to control its respective unit arresting means until a break in unit feed on the conveyor with which said first actuated detector is associated occurs.

39. A system as claimed in claim 38 in which the unit arresting means lost to the control of the detector rendered inoperative by the first actuated detector is connected in said control circuit to be projected into unit arresting position following unit delivery past such arresting position and into said diverting station against the other unit arresting means to block unit delivery past such arresting position during the diverting cycle.

40. A system as claimed in claim 38 provided with first and second electrically controlled power operated unit feed interrupting brake shoe devices associated with said first and second conveyors respectively, each of said latter brake shoe devices being mounted for movement into and out of engagement with the upper surfaces of rollers of its respective conveyor arriving adjacent to said diverting station, said latter brake shoe devices being operatively connected in said control circuit to be actuated to a roller engaging position to interrupt unit feed during diversion of a unit in said diverting station.

41. A system as claimed in claim 40 in which said control circuit includes circuit means for selectively retaining one of said feed interrupting brake shoe devices in roller engagement according to a desired selected direction of feed to said diverting station, and for effecting the withdrawal of the other of said feed interrupting brake shoe devices from roller engagement when said diverting station is empty and awaiting a unit to be diverted.

42. A system as claimed in claim 41 in which said diverter device is mounted to reciprocate between a first limit position at one side of said conveyors and a second limit position at the other sde of said conveyors, a first limit switch arranged to be actuated upon said diverter device reaching said first limit position and a second limit switch arranged to be actuated upon said diverter device reaching said second limit position, both said first and second limit switches being connected in said control circuit to effect reversal of said diverter device and at least one of said limit switches being connected to halt said diverter device and prepare said control circuit for delivery of a subsequent unit to and its diversion from said diverting station.

43. A system as claimed in claim 42 in which both said first and second limit switches are connected in said control circuit to halt said diverter device and prepare said control circuit for a subsequent unit delivery and diverting cycle and said control circuit includes selector switch means to shut out the diverter device halting operation and the control circuit preparing operations of either of said limit switches.

44. A system as claimed in claim 43 in which electrically controlled power operated means are provided to drive said stationary rollers in rotation.

45. A system as claimed in claim 44 in which said control circuit includes selector switch means to selectively deenergize said roller drive means to render same inactive and to energize said control circuit for a unit diversion cycle and vice versa.

46. A system as claimed in claim 43 in which said roller platform is vertically reciprocal, and means are provided for elevating and lowering said roller platform.

47. A system as claimed in claim 43 in which said roller platform is vertically reciprocal and also rotatable about a vertical axis.

References Cited in the file of this patent

UNITED STATES PATENTS

| | | |
|---|---|---|
| 1,432,086 | Plonka | Oct. 17, 1922 |
| 2,130,323 | Lueckel | Sept. 13, 1938 |
| 2,732,057 | Temple | Jan. 24, 1956 |
| 2,790,531 | McVicker | Apr. 30, 1957 |
| 2,829,758 | Temple | Apr. 8, 1958 |

FOREIGN PATENTS

| | | |
|---|---|---|
| 280,674 | Great Britain | Nov. 24, 1927 |